United States Patent
Restorff et al.

(10) Patent No.: US 7,710,713 B2
(45) Date of Patent: May 4, 2010

(54) FLAT SEALING OF ANODE/SEPARATOR ASSEMBLY FOR USE IN CAPACITORS

(75) Inventors: Monica Restorff, Orchard Park, NY (US); Douglas Eberhard, Grand Island, NY (US); Troy Lindke, Gasport, NY (US)

(73) Assignee: Greatbatch Ltd., Clarence, NY (US)

( * ) Notice: Subject to any disclaimer, the term of this patent is extended or adjusted under 35 U.S.C. 154(b) by 184 days.

(21) Appl. No.: 11/858,176

(22) Filed: Sep. 20, 2007

(65) Prior Publication Data
US 2008/0068779 A1   Mar. 20, 2008

Related U.S. Application Data

(60) Provisional application No. 60/826,224, filed on Sep. 20, 2006.

(51) Int. Cl.
  *H01G 9/04* (2006.01)
  *H01G 9/145* (2006.01)
  *H01G 9/02* (2006.01)
  *H01G 9/00* (2006.01)

(52) U.S. Cl. .................. 361/508; 361/512; 361/503; 29/25.03

(58) Field of Classification Search ............... 361/517, 361/512, 508, 503, 519, 518; 29/25.03; 607/5
See application file for complete search history.

(56) References Cited

U.S. PATENT DOCUMENTS

| 5,147,737 | A | 9/1992 | Post et al. |
| 5,631,102 | A | 5/1997 | Spillman et al. |
| 6,219,222 | B1 | 4/2001 | Shah et al. |
| 6,297,943 | B1 * | 10/2001 | Carson ................. 361/500 |
| 6,451,073 | B1 | 9/2002 | Farahmandi et al. |
| 6,576,524 | B1 * | 6/2003 | Evans et al. ............ 438/381 |
| 6,687,117 | B2 | 2/2004 | Liu et al. |
| 6,709,785 | B2 | 3/2004 | Lee et al. |
| 7,072,171 | B1 | 7/2006 | Muffoletto et al. |
| 7,385,802 | B1 * | 6/2008 | Ribble et al. ............ 361/508 |
| 7,531,010 | B1 * | 5/2009 | Feger et al. ............ 29/25.03 |
| 2002/0106557 | A1 | 8/2002 | Fraser-Bell et al. |
| 2003/0090857 | A1 | 5/2003 | Liu et al. |
| 2004/0265683 | A1 | 12/2004 | Merrill et al. |
| 2005/0117277 | A1 | 6/2005 | Norton et al. |

FOREIGN PATENT DOCUMENTS

JP     11260673 A   *   9/1999

\* cited by examiner

*Primary Examiner*—Eric Thomas
*Assistant Examiner*—David M Sinclair
(74) *Attorney, Agent, or Firm*—Michael F. Scalise

(57) ABSTRACT

An anode/separator assembly for a capacitor is described. The capacitor includes a pellet of anode active material having opposed first and second major faces extending to a surrounding side wall and a separator enveloping the pellet. The separator is formed of a first sheet of separator material including a first central region contiguous with the first major face wall of the anode pellet and a first perimeter region folded in contact with the surrounding side wall of the anode pellet, and a second sheet of separator material including a second central region contiguous with the second major face wall of the anode pellet and a second perimeter region overlapping a portion of the first perimeter region of the first separator sheet. The first and second sheets of separator material are then sealed to each other at a seam formed at the overlap between them using the anode pellet surrounding sidewall as a backing surface for a heat sealing device.

25 Claims, 17 Drawing Sheets

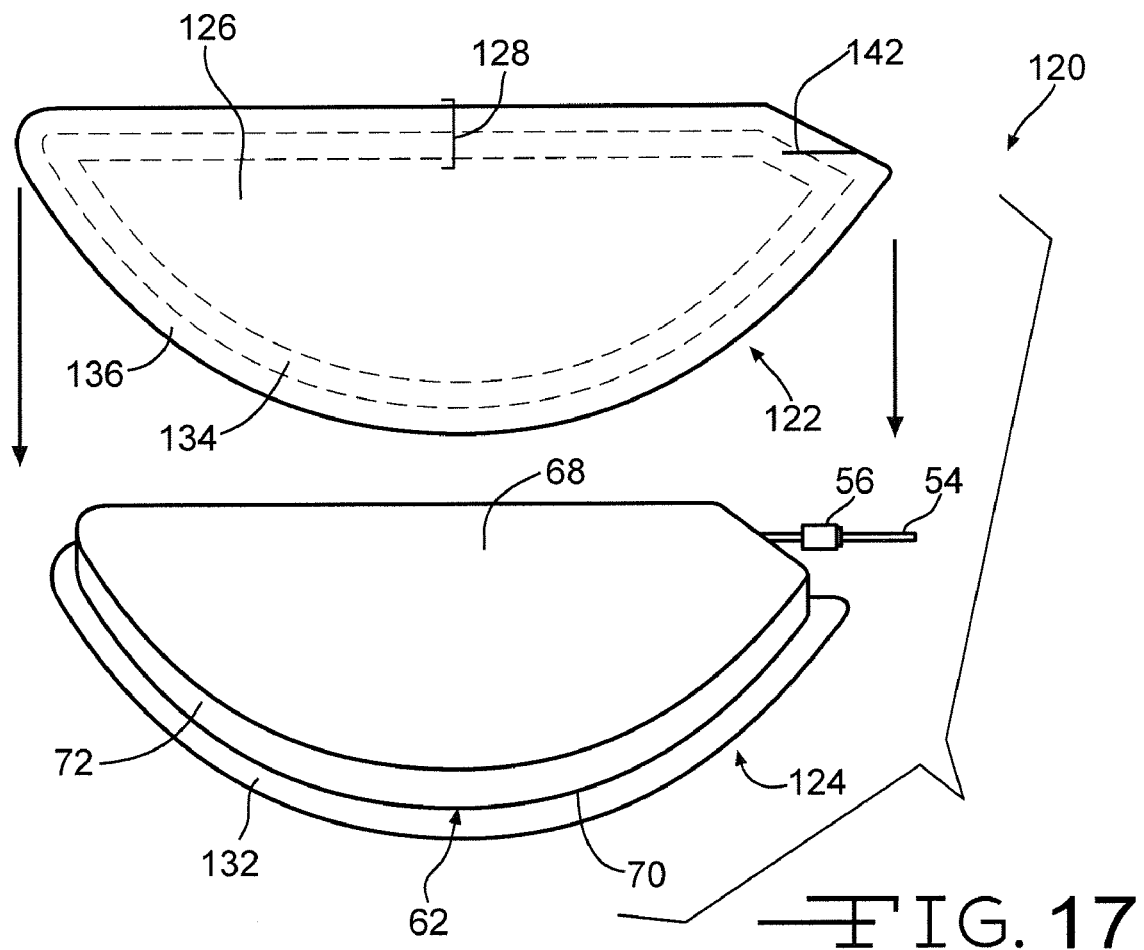
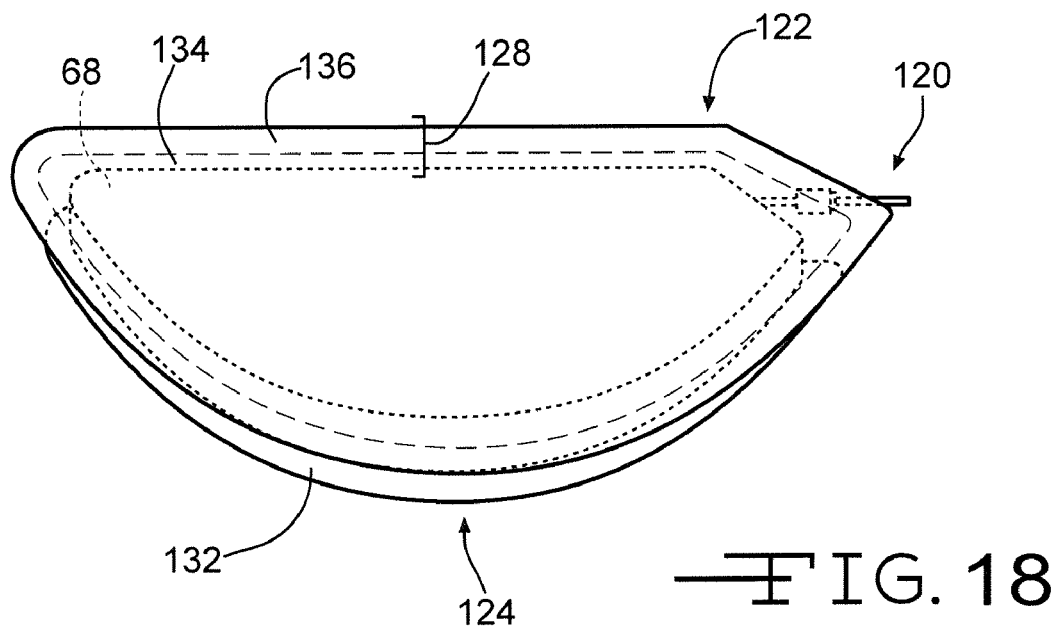

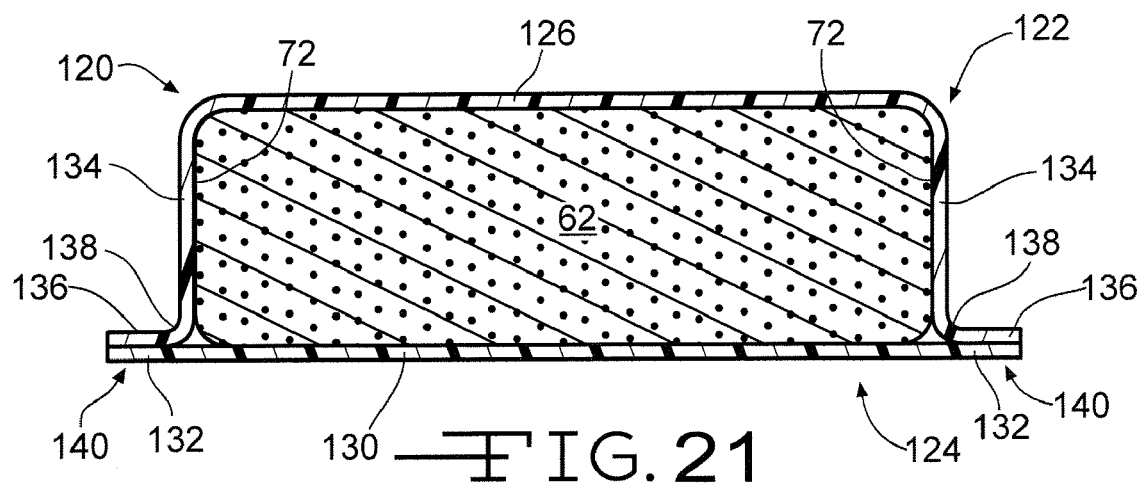
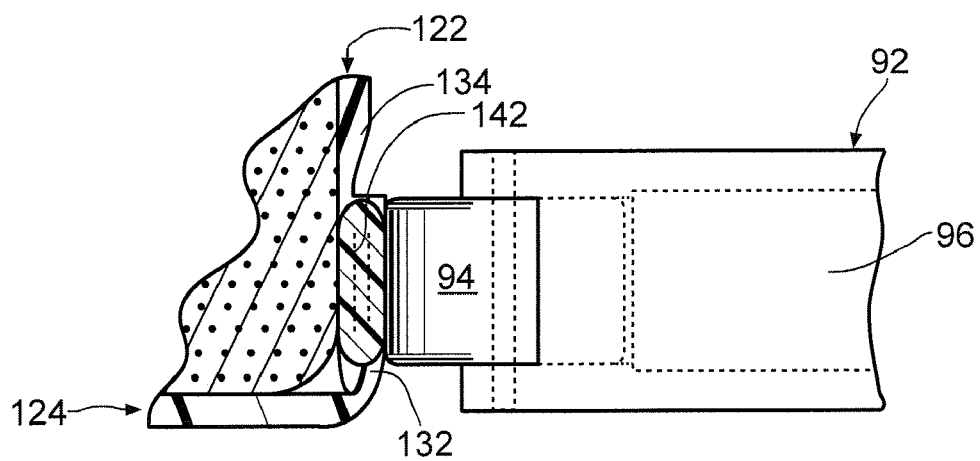
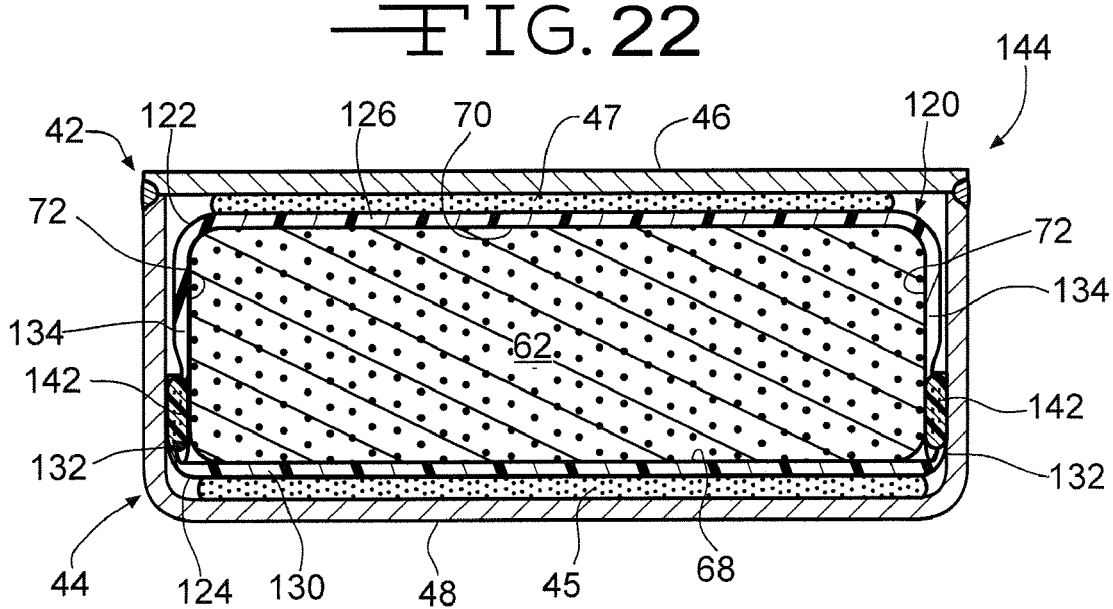

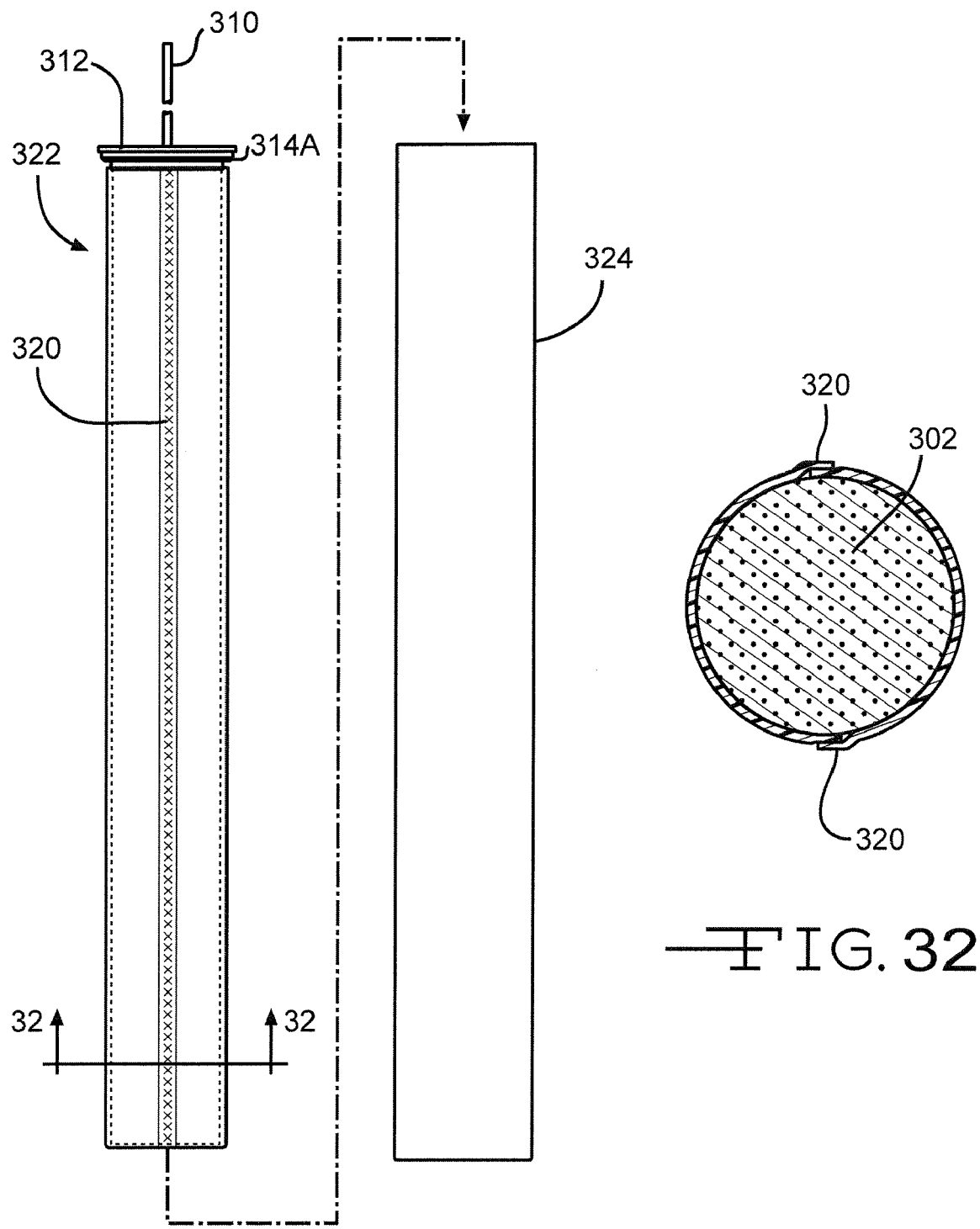

FLAT SEALING OF ANODE/SEPARATOR ASSEMBLY FOR USE IN CAPACITORS

CROSS-REFERENCE TO RELATED PATENT APPLICATIONS

This application claims priority from U.S. provisional patent application Ser. No. 60/826,224, filed Sep. 20, 2006.

BACKGROUND OF THE INVENTION

1. Field of the Invention

The present invention relates generally to a capacitor, and more particularly, to a capacitor with a sealed sheet of separator enclosing the capacitor anode.

2. Prior Art

The current trend in medicine is to make cardiac defibrillators, and like implantable devices, as small and lightweight as possible without compromising their power. This, in turn, means that capacitors contained in these devices must be made with minimal size while still meeting the power and energy requirements of the devices. In general, an optimum capacitor design provides as much cathode and anode active materials within the capacitor casing as possible. In order to accomplish this, the volume needed for non-capacitive components, such as separators, insulating rings, connecting and feedthrough wires, and a glass-to-metal seal should be minimized.

In an electrochemical capacitor, a separator is disposed between each opposed anode and cathode surface to prevent an internal electrical short circuit between the opposite polarity active materials. FIGS. 2 to 4 illustrate a prior art capacitor 10 comprising a separator 12 enveloping an anode pellet 14 of a commonly used shape. The separator 12 is preferably formed as a pouch that encloses the anode 14 isolated from the cathode active materials 16 and 18 supported on the interior surfaces of the casing members 20 and 22, respectively. In fabrication, sheets 24 and 26 of separator material are placed in contact with the anode 14 and heat sealed to each other by a hot press 30 (FIG. 3) near the lower perimeter 28 of the anode 14. Excess separator material (not shown) is cut away (if necessary) during or after the heat sealing process, leaving a selvage flap 32 around the anode pellet 14 that consists of a double layer of the fused separator sheets 24, 26.

Casing member 20 is made with the minimum volume required to receive the anode pellet 14 enclosed in the separator 12. The separator selvage flap 32 is folded upwardly when the anode 14 enveloped in the separator 12 is disposed in the casing member 20. The selvage flap 32 is contained in a gap 34 formed between a portion of the separator 12 that is contiguous with the sidewall 33 of anode 14 and the sidewall 36 of casing member 20. This gap 34 is present around the entire anode sidewall 33 and constitutes wasted space within the capacitor 10 that does not contain electrode active material.

Thus, current separator sealing methods result in the relatively thick separator selvage flap 32 that necessitates providing the gap 34 within capacitor 10, thereby lowering capacitor volumetric energy density. What is needed, therefore, is a method of sealing the separator material around a capacitor anode that either provides no selvage flap, or a selvage flap of minimal thickness, thereby reducing or eliminating the associated wasted space in the capacitor.

SUMMARY OF THE INVENTION

The present invention meets this need by providing a capacitor comprising a pellet of anode active material. In one embodiment, the pellet is formed having opposed first and second major face walls extending to a surrounding sidewall. A separator encloses the anode pellet. In this embodiment, the separator is comprised of a first sheet of separator material including a first central region contiguous with the first major face wall of the pellet and a first perimeter region folded in contact with the surrounding sidewall of the anode pellet, and a second sheet of separator material including a second central region contiguous with the second major face wall of the anode pellet and a second perimeter region overlapping a portion of the first perimeter region of the first separator sheet, thereby forming an overlap between the first and second separator sheets at their respective perimeter regions. The first and second separator sheets are then sealed to each other at a seam formed at the overlapped perimeter regions. The seam is contiguous with a portion of the surrounding side wall of the anode pellet.

The first and second sheets of separator material may be pre-cut to shapes corresponding to the shape of the anode pellet. The first and second separator sheets may also be comprised of a plurality of layers of separator material. For example, the first separator sheet may be comprised of first and second layers of separator material, and the second separator sheet may be comprised of third and fourth layers of separator material. The first, second, third, and fourth layers of separator material may be interleaved prior to forming the seam. The sheets of separator material may be made of polyolefinic fibers including polypropylene and polyethylene, or fluoropolymeric fibers including polyvinylidene fluoride, polyethylenetetrafluoroethylene, polytetrafluoroethylene, and polyethylenechloro-trifluoroethylene.

In accordance with the present invention, there is also provided a capacitor comprising a casing comprising first and second casing members secured to each other, an anode comprising a pellet of anode active material having opposed first and second major face walls extending to a surrounding sidewall, a separator enclosing the pellet as recited previously herein, a cathode comprising cathode active material opposed to the first and second major face walls of the anode pellet; and an electrolyte contacting the cathode and the anode.

In accordance with the present invention, there is also provided a method for making an anode/separator assembly for a capacitor. One embodiment of the method comprises providing an anode in the form of a pellet of anode active material having opposed first and second major face walls extending to a surrounding sidewall; contacting the first major face wall of the anode pellet with a first central region of a first sheet of separator material; folding a first perimeter region of the first separator sheet into contact with the surrounding sidewall of the pellet; contacting the second major face wall of the anode pellet with a second central region of a second sheet of separator material; contacting the second perimeter region of the second separator sheet with the first perimeter region of the first separator sheet to form an overlap between the first and second separator sheets at their respective perimeter regions; and sealing the first and second separator sheets to each other at the overlap to form a seam that is contiguous with a portion of the surrounding sidewall of the pellet.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which:

FIG. 17 is a perspective view showing placing the second separator sheet 124 in contact with the anode pellet 62.

FIG. 18 is a perspective view showing placing the first separator sheet 122 in contact with the capacitor anode pellet 62.

FIG. 21 is a cross-sectional view taken along line 21-21 of FIG. 19 prior to the folding the overlap 140 along the sidewall 72 of the anode pellet 62.

FIG. 22 is a cross sectional view of one embodiment of the sealing of the capacitor anode/separator assembly 120.

FIG. 23 is a cross-sectional view of a capacitor 144 of the present invention comprising an anode-separator assembly 120 made by the method depicted in FIGS. 16 to 22.

FIGS. 28 to 34 illustrate a further embodiment of the invention where a one piece separator sheet 314 is used to envelope a cylindrically-shaped anode pellet 302.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

Figure 1:
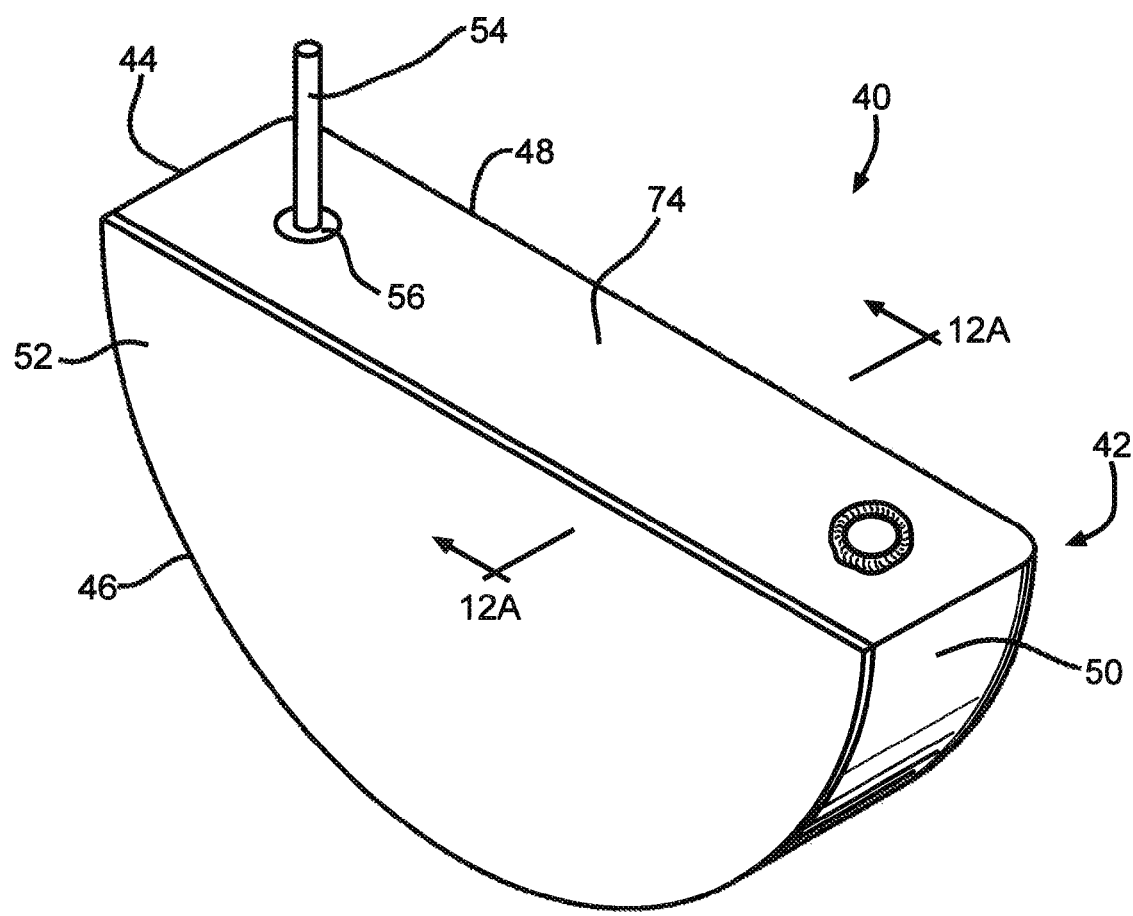
FIG. 1 is a perspective view of a capacitor 10 according to the present invention.
Figure 2:
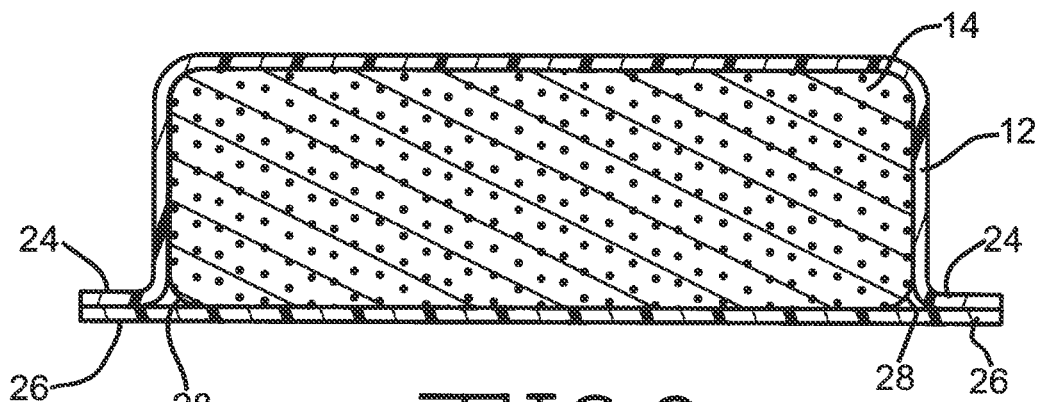
FIG. 2 is a cross-sectional view of a capacitor anode enclosed in sheets of separator material, prior to sealing of the separator according to a method of the prior art.

FIG. 1 is a perspective view of a capacitor according to the present invention. The capacitor 40 is shown in cross-section in FIG. 12A and comprises a casing 42 including first and second casing members 44 and 46 secured to each other, an anode 62 is housed within the casing and comprises anode active material, and the interior face walls of the casing members 44 and 46 support coated films 45 and 47 of cathode active material to provide a cathode. The first casing member 44 includes a first face wall 48 joined to a surrounding sidewall 50, and the second casing member 46 includes a second face wall 52 secured to the surrounding sidewall 50 of the first casing member 44.

Capacitor 40 is further comprised of a terminal pin 54 extending from the anode within the capacitor through a glass-to-metal seal 56 to the exterior thereof. The location of the terminal pin 54 and the glass-to-metal seal 56 may vary from that shown in FIG. 1.

Figure 5:
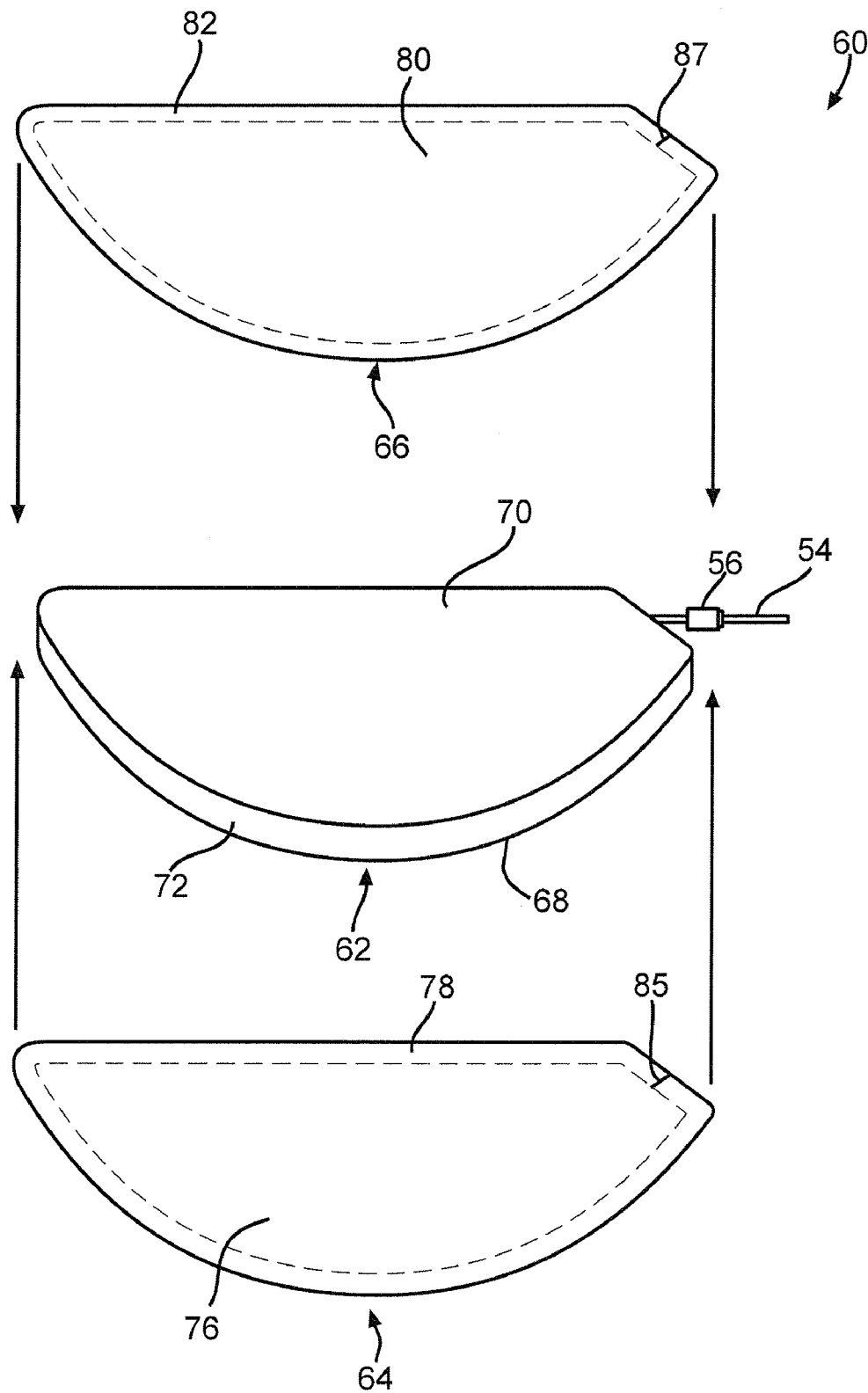
FIG. 5 is an exploded perspective view of components of a first embodiment of a capacitor anode-separator assembly 60 of the present invention, prior to sealing the separator sheets around an anode pellet 62.

FIGS. 5 to 12A depict one embodiment of the manufacture of an anode/separator assembly 60 for the capacitor 40. Turning first to FIG. 5, assembly 60 is comprised of an anode pellet 62, a first sheet 64 of separator material and a second sheet 66 of separator material. The anode pellet 62 has opposed first and second major face walls 68 and 70 extending to a surrounding sidewall 72. The anode pellet 62 may have a shape other than that shown. Additionally, the terminal pin 54 and glass-to-metal seal 56 may extend from anode pellet 62 at a location other than that shown. For example, the terminal pin 54 may have a 900 bend or joint (not shown) and exit through the flat region 74 of the sidewall 50 of casing member 44, as shown in FIG. 1.

The anode pellet 62 is enveloped in the separator by placing a first separator sheet 64 in contact with the first major face wall 68 of the anode pellet 62 and a second separator sheet 66 in contact with the second major face wall 70 of the anode pellet 62. The respective perimeter regions of the separator sheets 64 and 66 are folded into an overlapping relationship, and then sealed to each other as shown in FIGS. 6 to 11. Referring again to FIG. 5, the first and second separator sheets 64, 66 may be pre-cut to shapes corresponding to the major face walls 68, 70 of the anode pellet 62, but sized larger so that their respective perimeter regions may be folded to overlap each other, and then be sealed together. In an alternate embodiment, the separators 66, 68 are square sheets that are cut or trimmed to the desired shape during the folding and sealing steps, which will be described in detail hereinafter. In any event, the first separator sheet 64 is comprised of a central region 76 and a perimeter region 78, and the second separator sheet 66 is comprised of a central region 80 and a perimeter region 82.

Figure 6:
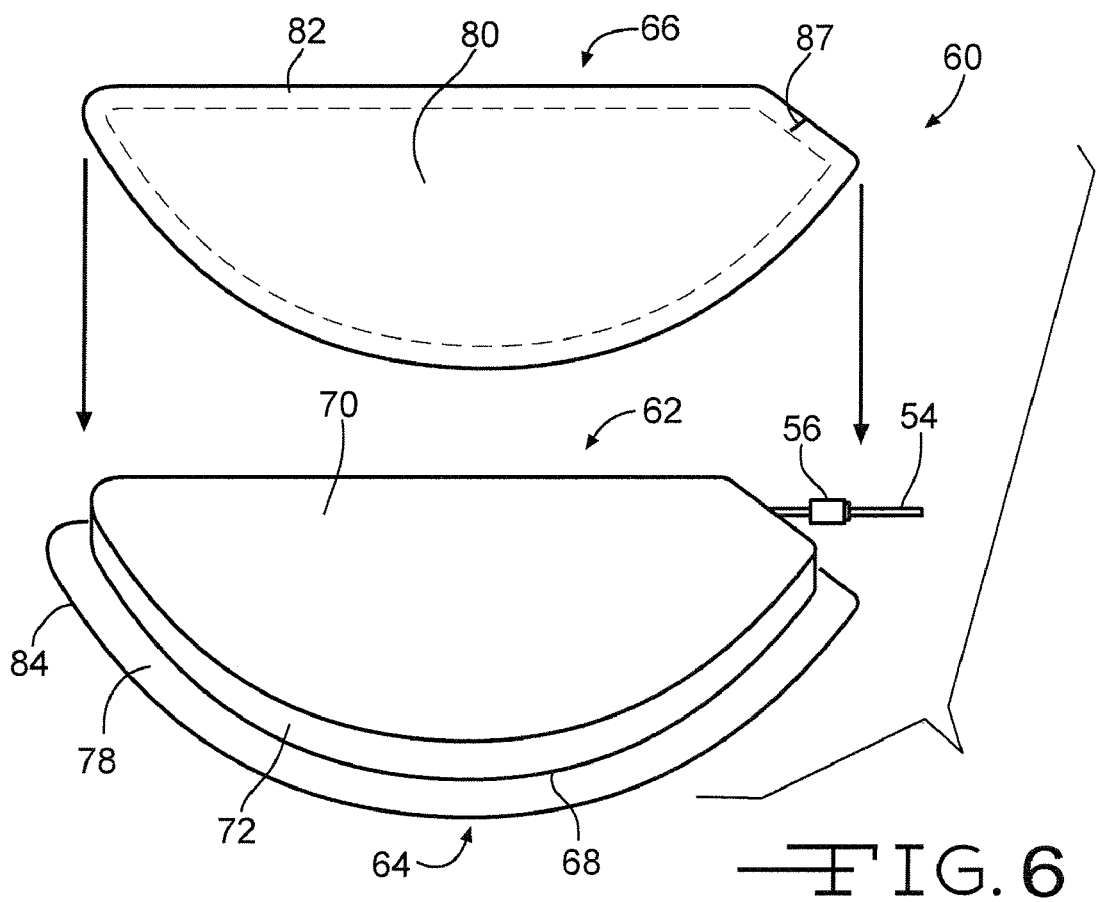
FIG. 6 is a perspective view showing placing a first separator sheet 64 in contact with the anode pellet 62.
Figure 7:
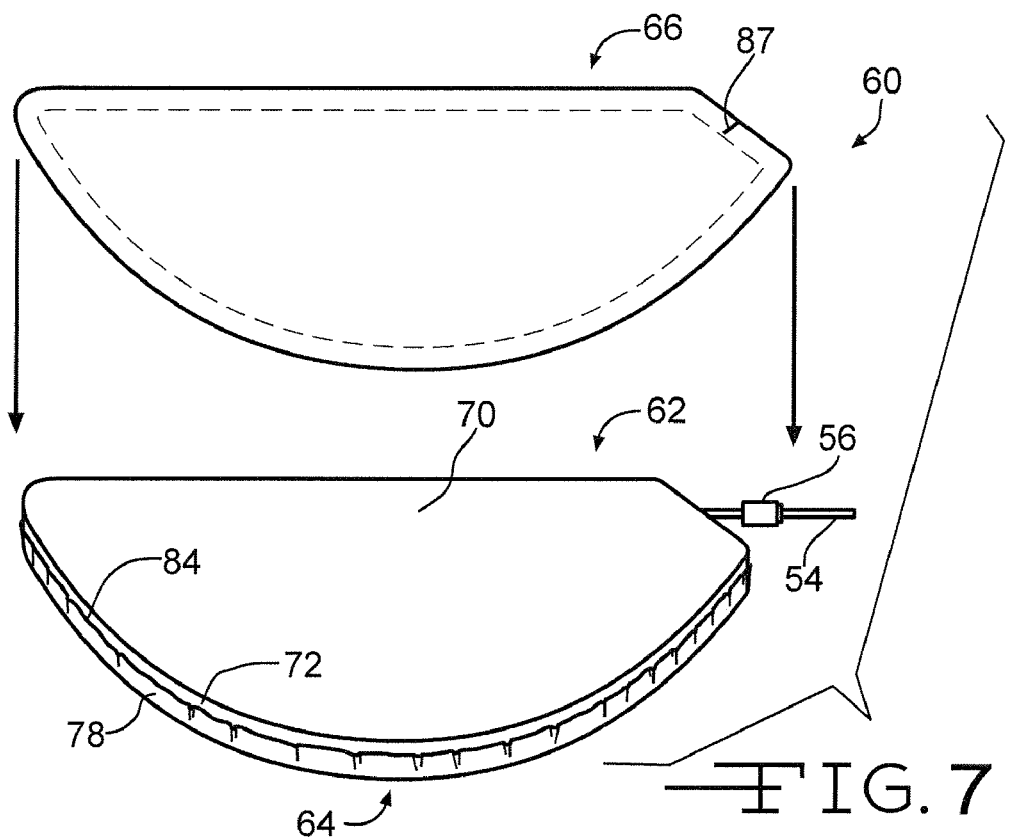
FIG. 7 is a perspective view showing folding the perimeter of a first separator sheet 64 into contact with the sidewall 72 of the anode pellet 62.
Figure 8:
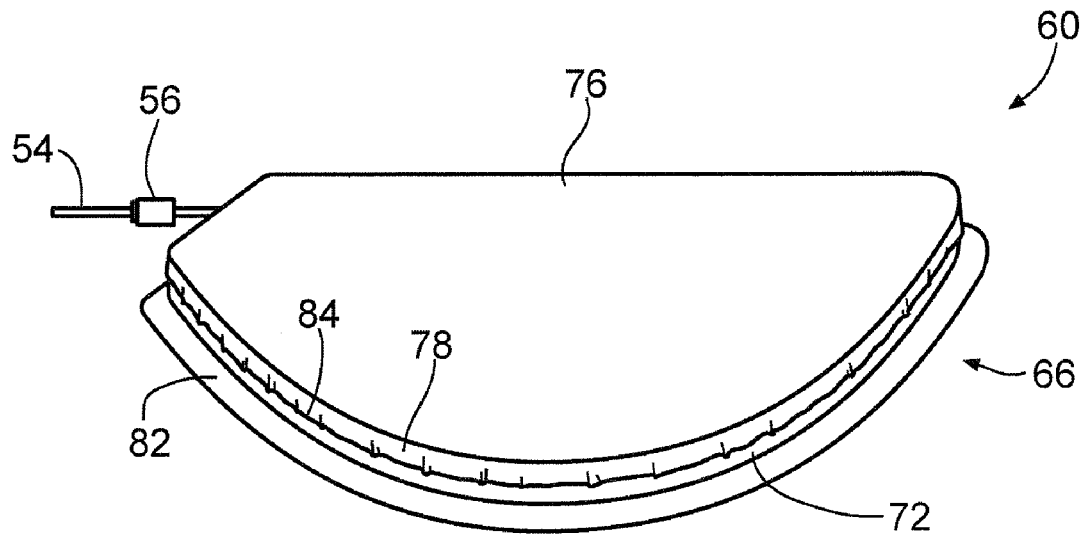
FIG. 8 is a perspective view showing placing a second separator sheet 66 into contact with the anode pellet 62.

The sequence of steps for making one embodiment of the anode/separator assembly will now be described. Referring to FIGS. 5 and 6, the central region 76 of the first separator sheet 64 is placed in contiguous contact with the first major face wall 68 of the anode pellet 62. Referring to FIG. 7, the perimeter region 78 of the first separator sheet 64 is then folded into contact with the surrounding sidewall 72 of the anode pellet 62. This may be accomplished by providing a crimping tool (not shown) having a slightly recessed cavity of the same shape as the anode pellet 62, but with a slightly larger perimeter. The first separator sheet 64 and the anode pellet 62 are first positioned together at a location above the cavity of the tool as shown in FIG. 6, and moved downwardly into the cavity. The cavity is provided with the minimal clearance sufficient for the perimeter region 78 of the first separator sheet 64 to fit between the cavity wall and the surrounding sidewall 72 of the anode pellet 62. In that manner the perimeter region 78 of the first separator sheet 64 is folded upwardly along the surrounding side wall 72 of the anode pellet 62. The depth of the cavity of the crimping tool is a fraction of the height of the surrounding sidewall 72 of the anode pellet 62, such that the edge 84 of the first separator sheet 64 remains exposed and can subsequently form an overlap with the perimeter region 82 of the second separator sheet 66. The perimeter region 78 of the first separator sheet 64 may also be provided with a slit 85 (FIG. 5), or a notch (not shown) that receives terminal pin 54 when the perimeter region 78 is folded into contact with the surrounding sidewall 72 of the anode pellet 62.

Figure 9:
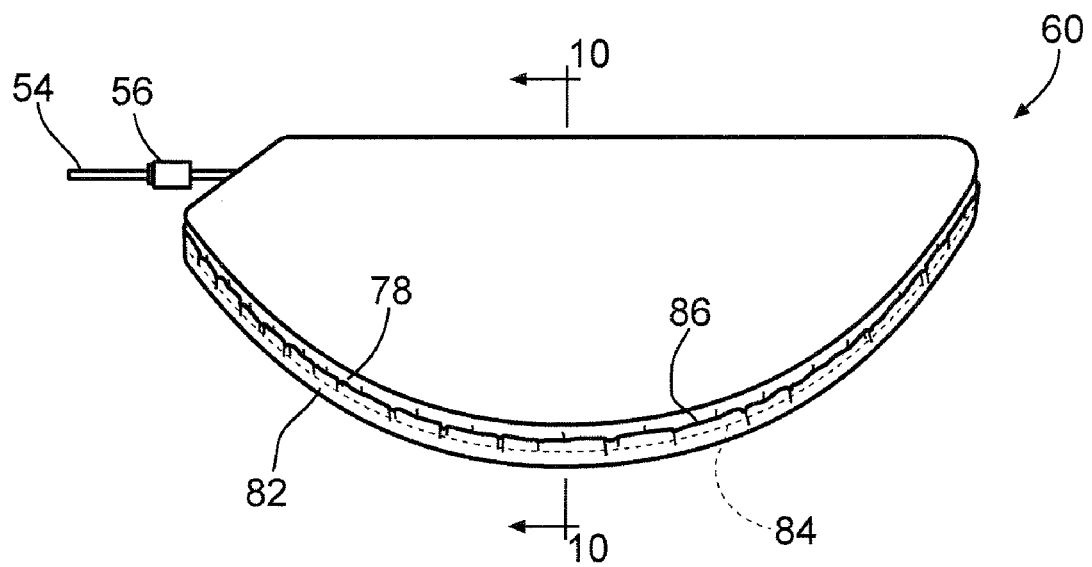
FIG. 9 is a perspective view showing folding the perimeter of the second separator sheet 66 into contact with the sidewall 72 of the anode pellet 62.
Figure 10:
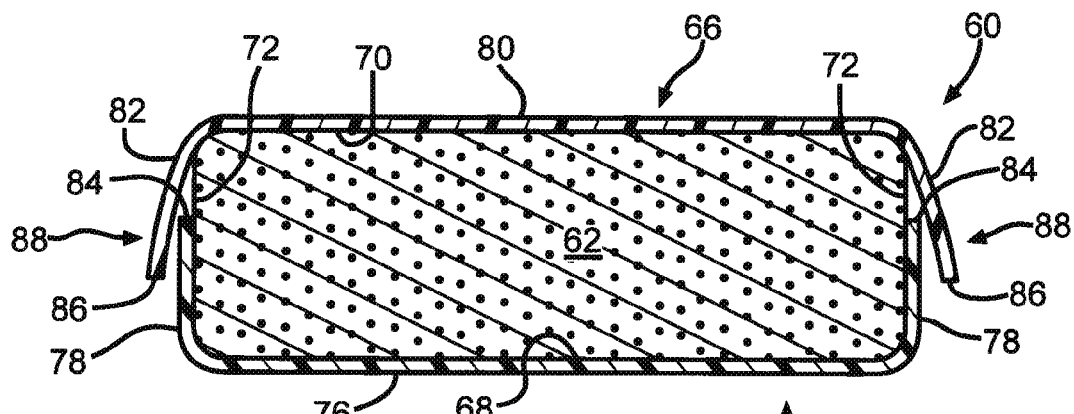
FIG. 10 is a cross-sectional view taken along line 10-10 of FIG. 9 prior to sealing of the separator sheets.

The central region 80 of the second separator sheet 66 is next placed in contiguous contact with the second major face wall 70 of the anode pellet 62. (It is noted that for clarity of illustration in FIGS. 8 and 9, the anode pellet 62, the first separator sheet 64, and the second separator sheet 66 have been inverted from their respective positions in FIGS. 5 to 7.) Referring to FIG. 9, the perimeter region 82 of the second separator sheet 66 is folded into contact with the surrounding sidewall 72 of the anode pellet 62. This may be accomplished by using a crimping tool as described previously. Referring also to FIG. 10, the outer edge 86 of the perimeter region 82 of the second separator sheet 66 is now located along the surrounding sidewall 72 beyond the outer edge 84 of the perimeter region 78 of the first separator sheet 64. This forms an overlap 88 between the first and second separator sheets 64, 66. (It is noted that in FIG. 10, the anode pellet 62, the first separator sheet 64, and the second separator sheet 66 are oriented as shown in FIGS. 5 to 7.) The perimeter region 82 of the first separator sheet 64 may also be provided with a slit 87 (FIG. 6), or a notch (not shown) that receives the terminal pin 54 when the perimeter region 82 is folded into contact with the surrounding sidewall 72 of the anode pellet 62.

Figure 11:
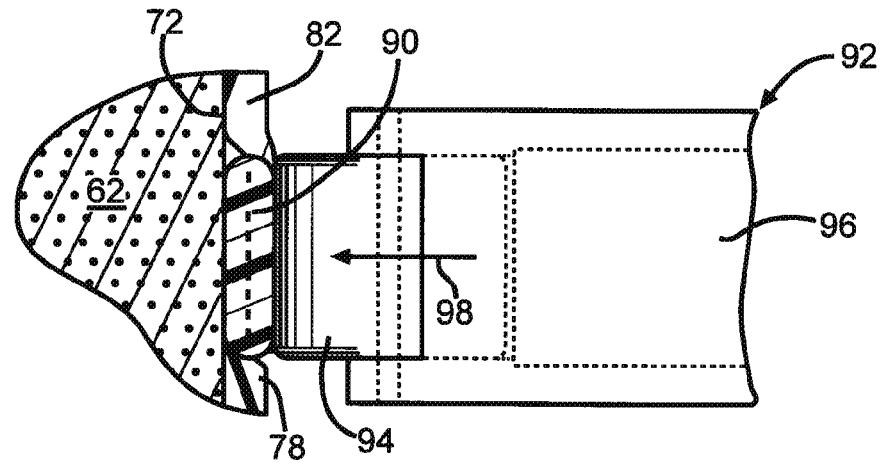
FIG. 11 is a cross sectional view of one embodiment of the sealing of the anode pellet 62 within the separator sheets 64 and 66 to form an anode-separator assembly 60 of the present invention.

Turning now to FIG. 11, the first and second sheets 64, 66 of separator material are sealed to each other at a seam 90 formed at the overlap 88 between them. The seam 90 is contiguous with a portion of the surrounding sidewall 72 of the anode pellet 62. As used herein, the terms "sealed" and "sealing" in reference to sheets of separator material are meant to indicate the joining of the sheets to form a seam with the separator materials fused to each other. The seam may have some intermixing of the material of the first sheet with the material of the second sheet. The terms "sealed" and "sealing" are not meant to indicate the creation of a hermetic seal between the two separator sheets.

The sealing of the separator sheets is preferably performed with a heat sealing device. Suitable ones include devices that dissipate electrical energy such as that provided by a resistance heater and those that dissipate mechanical energy, such as that provided by an ultrasonic generator used, for example, in ultrasonic welding. In the embodiment shown in FIG. 11, a heated roller device 92 is used to seal the separator sheets 64 and 66 together to form the seam 90 at overlap 88. As the heater device 92 traverses around the perimeter of the anode/separator assembly 60, the roller 94 is in thermal contact with the heater 96 to receive heat energy therefrom. The heat energy is conducted into the overlap 88, and under pressure applied thereto as indicated by arrow 98 with the anode pellet 62 serving as a backing surface, the overlapping perimeter regions 78 and 82 are fused together to form the seam 90.

In another embodiment (not shown), heat sealing is performed by a set of deployable heat sealing bars. Each of the bars is shaped to match its corresponding portion of the anode pellet 62 and the separator overlap 88 around the perimeter thereof. When deployed against the separator, the heat sealing bars cover and apply heat and pressure to the complete length of the overlap 88 to thereby form the seam 90 with the anode pellet 62 again serving as a backing surface. A small gap may be provided between two of the bars to accommodate the terminal pin 54 where it protrudes from the anode pellet 62.

In another embodiment (not shown), heat sealing is performed by a heater that is provided in a pocket formed in a plate shaped to match the shape of the anode pellet 62. Such a "ring" heater may be provided as part of the second crimping tool that folds the perimeter region 82 of the second separator sheet 66 into contact with the surrounding sidewall 72 of the anode pellet 62 and that forms the overlap 88 with the perimeter region 78 of the first separator sheet 64.

Each of these heating devices has following common features. First, heat and pressure are applied directly to the overlap 88 to form the seam 90. Secondly, rather than providing a separate backing surface as part of the heating device, a sidewall of the anode pellet 62 serves as the backing surface to support the overlap 88. By using the anode pellet as the backing surface, a low profile seam 90 is produced.

Figure 4:
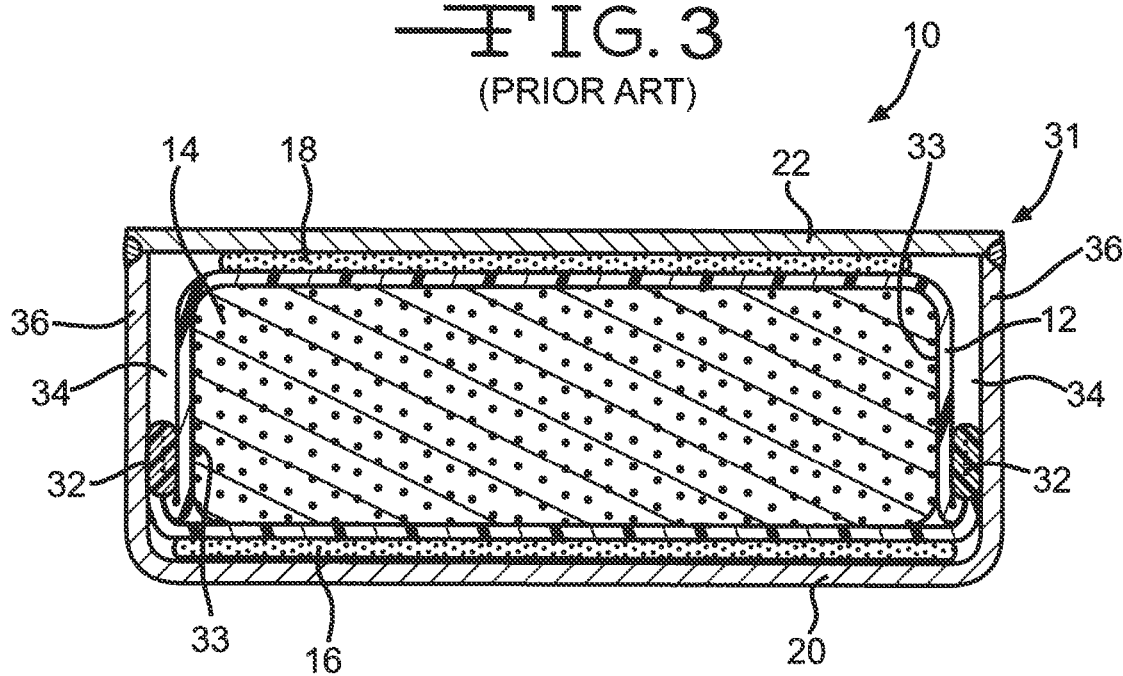
FIG. 4 is a cross-sectional view of a capacitor 10 comprising a separator 12 enveloping an anode 14 by the prior art method of FIG. 3.
Figure 12A:
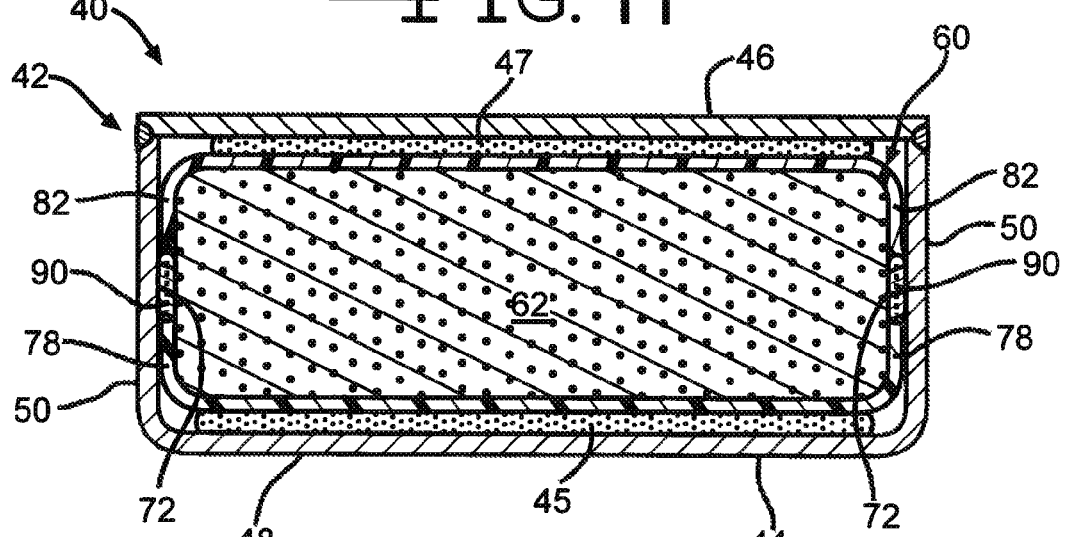
FIG. 12A is a cross-sectional view taken along line 12A-12A of FIG. 1 of a capacitor 40 of the present invention comprising the anode/separator assembly 60 fabricated by the method depicted in FIGS. 6 to 11.

FIG. 12A is a cross-sectional view of a capacitor 40 of the present invention comprising the anode/separator assembly 60 sealed by the method depicted in FIGS. 6 to 11. It can be seen that the separator seam 90 has a relatively low profile seam is contiguous with the sidewall 72 of the anode pellet 62. This is as a result of using the anode pellet 62 as the backing surface during sealing. In contrast, the separator selvage flap 32 forming the seam of the prior art capacitor 10 of FIG. 4 is not of a low profile. Instead, a gap 34 is required within the casing 31 (FIG. 4) to accommodate it. The gap 34 is present around the entire side wall 33 of anode pellet 14, constituting wasted space that does not contain electrode active material within the capacitor 10. This means that the present invention capacitor 40 is advantageous over the prior art capacitor 10 because it contains more active electrode material per unit volume, and thus has a higher volumetric energy density.

Figure 13:
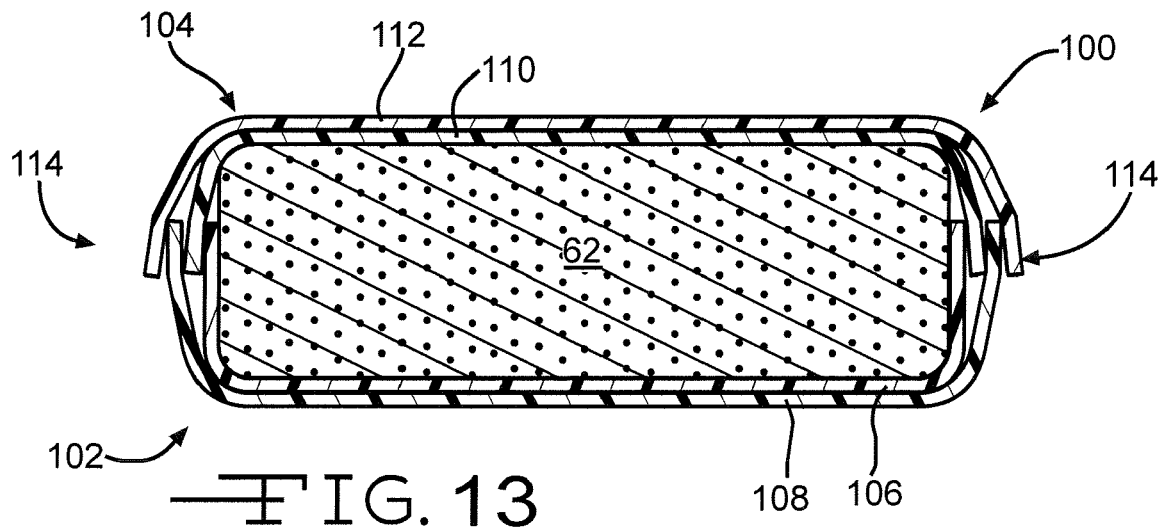
FIG. 13 is cross-sectional view of an alternative capacitor anode/separator assembly including a separator of two overlapped separator sheets 102 and 104 prior to sealing them together.

In a further embodiment, the first and second separator sheets may comprise a plurality of layers of separator material. FIG. 13 is a cross-sectional view of an exemplary alternative capacitor anode/separator assembly 100 including a separator of two overlapped sheets 102 and 104 of separator material prior to sealing of them around the anode pellet 62. The first separator sheet 102 is comprised of a first layer 106 and a second layer 108 of separator material. Similarly, the second separator sheet 104 is comprised of a third layer 110 and a fourth layer 112 of separator material.

The first and second separator sheets 102, 104 are contacted and folded around the anode pellet 62 as described previously, thereby forming an overlap 114. However, to make the seam more robust the first, second, third and fourth layers of separator material may be interleaved prior to forming the seam. For example, layer 106 of the first separator sheet 102 may be the innermost layer at the overlap 114, followed by layer 110 of second sheet 104, layer 108 of first sheet 102 and layer 112 of second sheet 104.

According to the present invention the separator sheet layers may be made of different materials. For example, the inner layers 106. 110 may be of a relatively porous material such as a polypropylene non-woven fabric and the outer layers 108, 112 may be a porous material such as CELGARD®. In one embodiment, a three-layer separator is provided with the inner two layers being of a polypropylene non-woven fabric and the outer layer being of CELGARD®.

Figure 14:
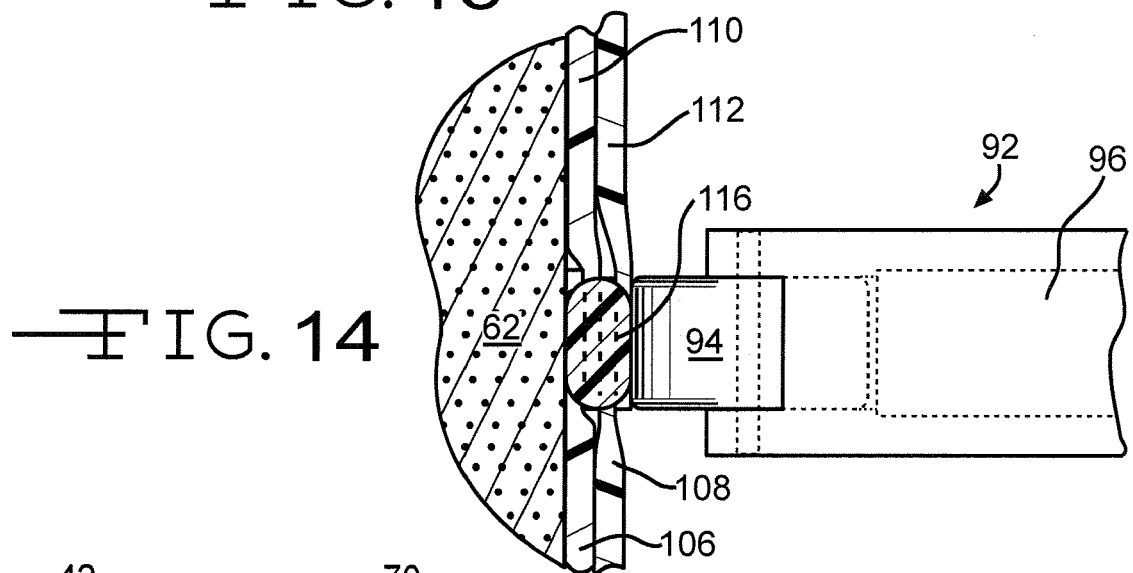
FIG. 14 is a detailed cross-sectional view of one embodiment of the sealing of the double-layer separator of FIG. 13.
Figure 15:
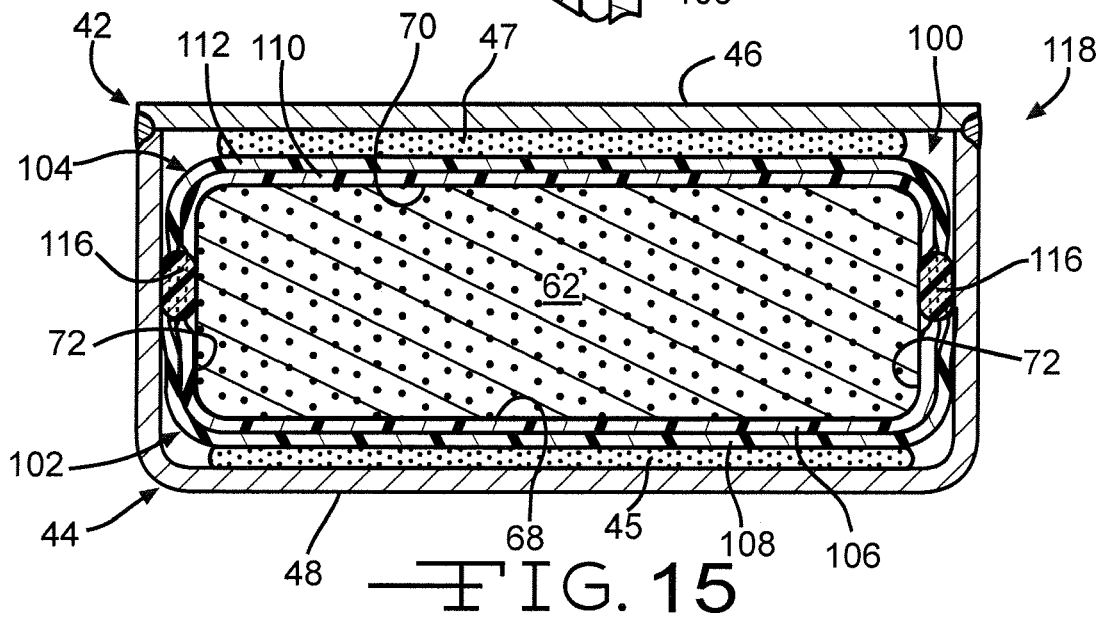
FIG. 15 is a cross-sectional view of a capacitor 118 of the present invention comprising an anode/separator assembly 100.

FIG. 14 is a detailed cross-sectional view of the sealing of the double-layer separator of FIG. 13. Heated roller device 92 is used to seal the pairs of layers 106 and 108, and 110 and 112 of the respective separator sheets 102 and 104 together to form the seam 116 at the overlap 114 with the anode pellet 62 serving as a backing surface. FIG. 15 is a cross-sectional view of a capacitor 118 comprising the double-layer anode/separator assembly 100 of FIGS. 13 and 14. Capacitor 118 is comprised of a casing 42 comprising first and second casing members 44 and 46 secured to each other, an anode/separator assembly 100 comprising an anode pellet 62 of anode active material enclosed in the double-layered separator sheets 102 and 104, a cathode comprising coated films 45 and 47 of cathode active material supported on the interior surfaces of the casing members opposite the first and second major face walls 68 and 70 of the anode pellet 62, and an electrolyte (not shown) contacting the cathode and the anode.

In another embodiment of the present anode/separator assembly, the first perimeter region of the first separator sheet is comprised of an inner perimeter region and an outer perimeter region, and the second perimeter region of the second separator sheet is in contact with the outer perimeter region of the first separator sheet, thereby forming the overlap between the first and second separator sheets. The overlap is then folded into contact with and sealed to the inner perimeter region of the first separator sheet. FIGS. 16 to 22 depict this embodiment of an anode/separator assembly 120, and a method of making the assembly.

Figure 16:
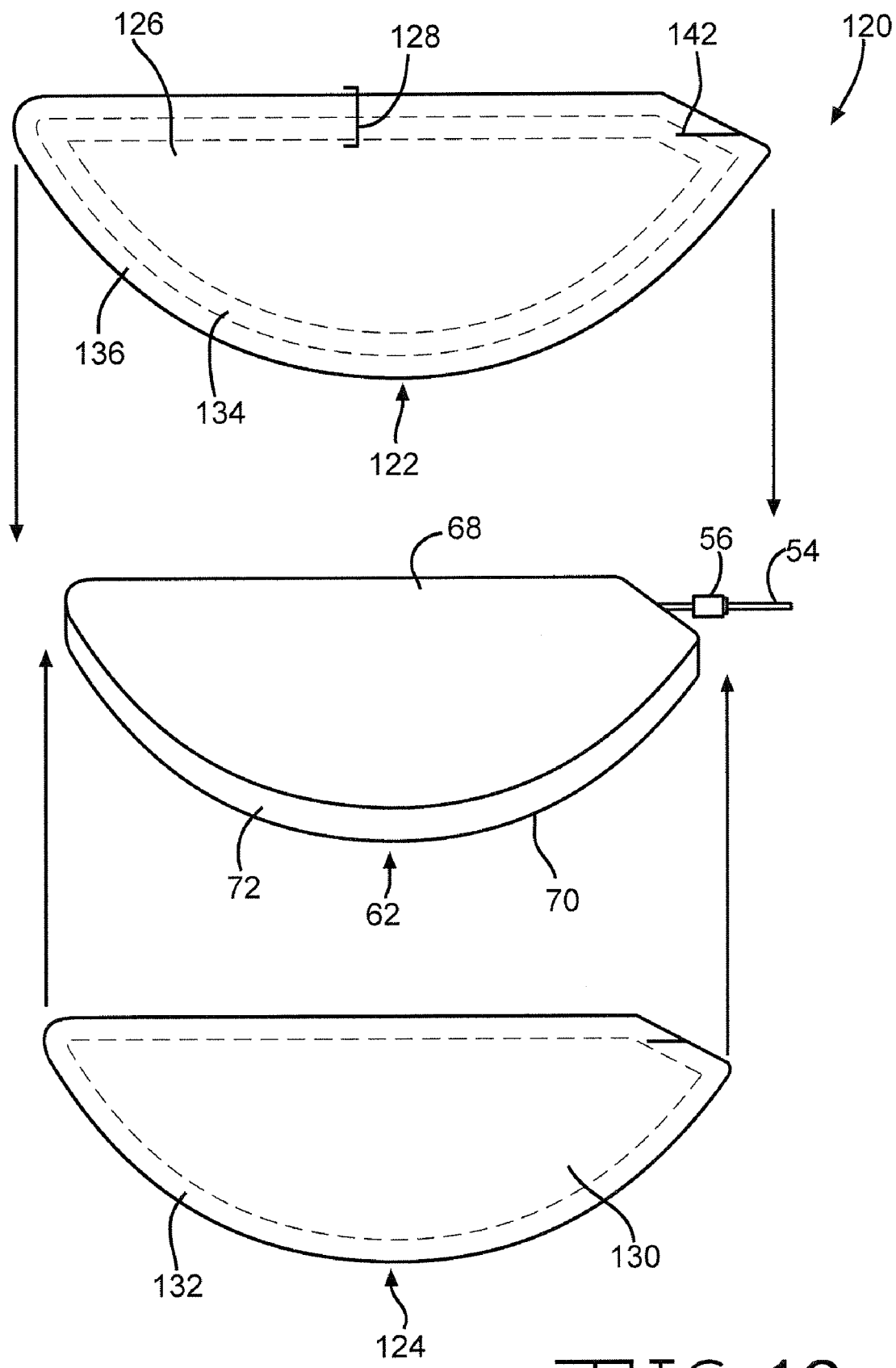
FIG. 16 is an exploded perspective view of a second embodiment of a capacitor anode/separator assembly 120 of the present invention, prior to sealing the separator sheets together.

Turning first to FIG. 16, assembly 120 is comprised of the anode pellet 62, a first separator sheet 122 and a second separator sheet 124. The anode pellet 62 has opposed first and second major face walls 68 and 70 extending to a surrounding side wall 72, as described previously. The separator is formed to enclose the anode pellet 62 by placing the second separator sheet 124 in contact with the second major face wall 70 of the anode pellet 62 and the first separator sheet 122 in contact with the first major face wall 68 of the anode pellet 62. The respective perimeter regions of the separator sheets 122 and 124 are folded into an overlapping relationship and then sealed to each other as shown in FIGS. 17 to 22.

Referring again to FIG. 16, the first and second separator sheets 122, 124 may be pre-cut to shapes corresponding to the major face walls 68, 70 of the anode pellet 62, but sized larger so that their respective perimeter regions may be folded to overlap each other. In an alternate embodiment, the separators 122, 124 are square sheets that are cut or trimmed to the desired shape during the folding and sealing steps. In any event, the first separator sheet 122 is comprised of a central region 126 and a perimeter region 128, and the second separator sheet 124 is comprised of a central region 130 and a perimeter region 132. The perimeter region 128 of the first separator sheet 122 is comprised of an inner perimeter region 134 and an outer perimeter region 136.

Figure 19:
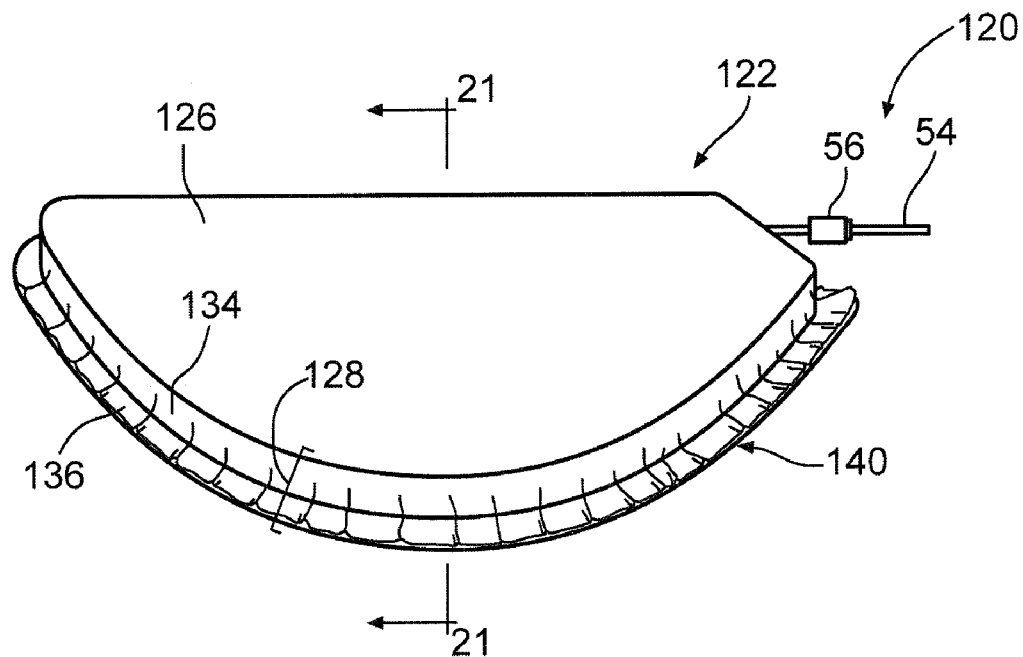
FIG. 19 is a perspective view showing folding the perimeter region 128 of a first separator sheet 122 into contact with the sidewall 72 of the anode pellet 62 and with the perimeter region 132 of a second separator sheet 124 to form an overlap 140 of the separator sheets.

The sequence of steps for making the anode/separator assembly 120 will now be described. Referring to FIGS. 16 to 18, the central region 130 of the second separator sheet 124 is placed in contiguous contact with the second major face wall 70 of the anode pellet 62. The central region 126 of the first separator sheet 122 is placed in contiguous contact with the first major face wall 68 of the anode pellet 62. Referring to FIGS. 19 and 21, the perimeter region 128 of the first separator sheet 122 is folded downwardly into contact with the surrounding side wall 72 of the anode pellet 62. This may be accomplished by using a crimping tool as described previously.

The first separator sheet 122 is made larger than the second separator sheet 124 and larger than the combined surface areas of the first major face wall 68 and the surrounding side wall 72 of the anode pellet 62. This is in order to attain the desired overlap for sealing the separator sheets 122 and 124 to each other. Thus when the perimeter region 128 of the first separator sheet 122 is folded downwardly, the inner perimeter region 134 thereof is placed in contact with the surrounding sidewall 72 of the anode pellet 62. The outer perimeter region 136 undergoes a reverse fold 138 and forms overlap 140 with the perimeter region 132 of the second separator sheet 124. The perimeter region 128 of the first separator sheet 122 may also be provided with a slit 142, or a notch (not shown) that receives terminal wire 54 when the perimeter region 128 is folded into contact with the surrounding sidewall 72 of the anode pellet 62.

Figure 3:
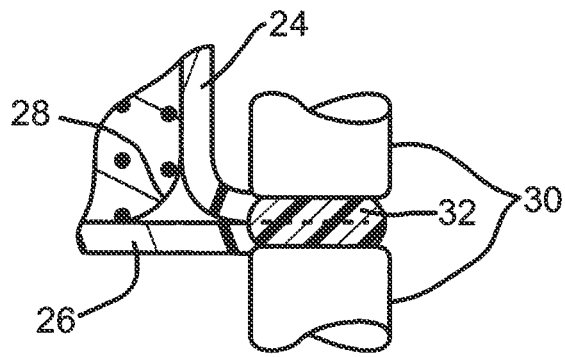
FIG. 3 is a detailed cross-sectional view of a prior art method for heat sealing a capacitor anode in two sheets of separator material.

Overlap 140 may undergo a first heat sealing using a heat sealing device such as hot press 30 of FIG. 3 to form a flap seam (not shown, but similar to seam 32 of FIG. 3) that is directed outwardly from the surrounding sidewall 72 of the pellet 62. The flap seam may be made continuously along the entire length of overlap 140 around pellet 62, or the flap seam may be intermittent, but sufficient to temporarily join the outer perimeter region 136 of the first separator sheet 122 with the perimeter region 132 of the second separator sheet 124.

Figure 20:
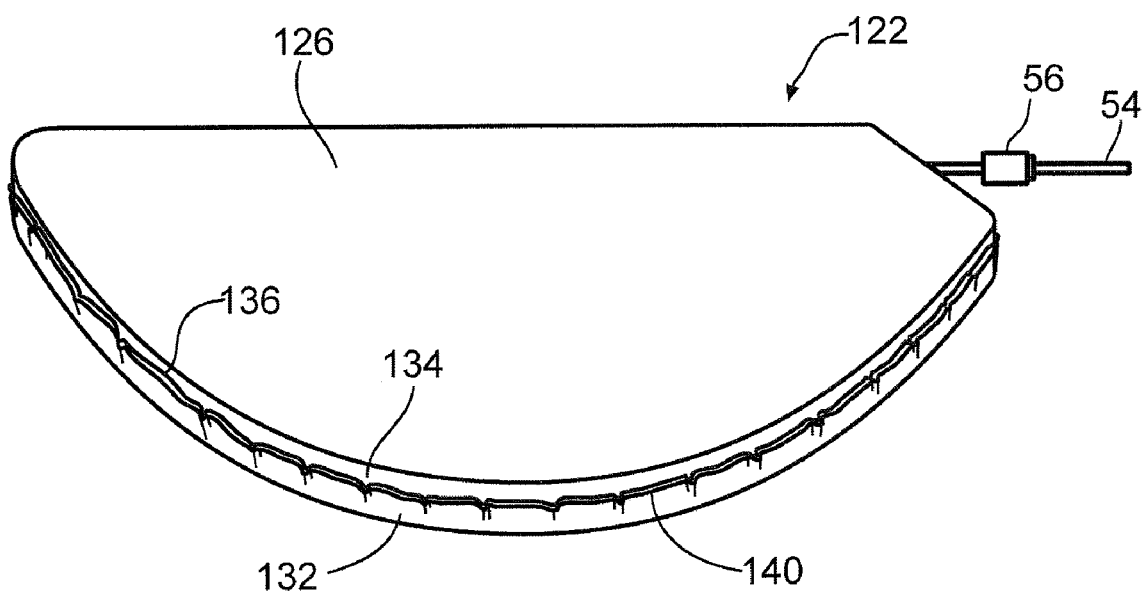
FIG. 20 is a perspective view showing folding the overlap 140 of the separator sheets along the outer perimeter region 134 of the first separator sheet 122 and along the sidewall 72 of the anode pellet 62.
Figure 24:
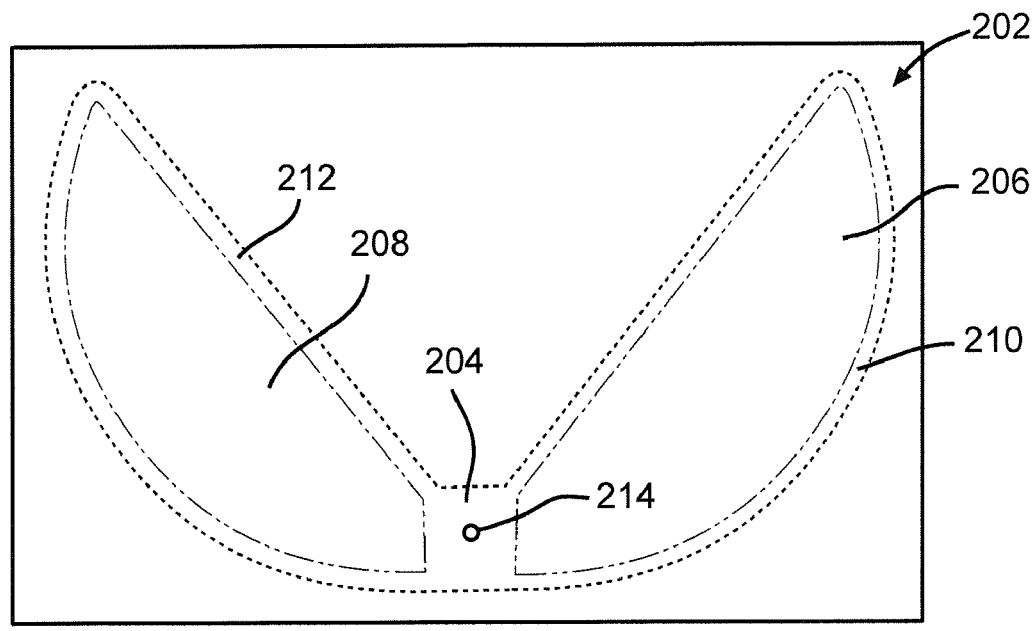
FIGS. 24 to 27 illustrate another embodiment of the invention where a separator sheet 202 having a shape similar to the combined first and second sheets 64, 66 shown in FIGS. 5 to 12, but of a one piece construction is used to envelope the anode pellet 62.

Referring now to FIG. 20, the overlap 140, which may be a flap seam, is folded in contact with the inner perimeter region 134 of the first sheet 122 of separator material. Referring to FIG. 22, the first and second sheets of separator material 122, 124 are sealed to each other at a seam 142 by sealing the overlap 140 and the inner perimeter region 134 of the first sheet 122 of separator material with the anode pellet 62 serving as a backing surface.

FIG. 23 is a cross-sectional view of a capacitor 144 comprising the anode/separator assembly 120 of FIGS. 16 to 22. Capacitor 144 is comprised of a casing 42 comprising first and second casing members 44 and 46 secured to each other to house the anode/separator assembly 120 as described above. Capacitor 144 is further comprised of a cathode comprising coated films 45 and 47 of cathode active material supported on the interior surfaces of the casing members opposite the first and second major face walls 68 and 70 of the anode pellet 62, and an electrolyte (not shown) contacting the cathode and the anode. It can be seen that seam 142 in capacitor 144 is of a relatively low profile as it is contiguous with the side all 72 of anode pellet 62. This is a result of using the anode pellet 62 as the backing surface during sealing. Capacitor 144 is thus advantageous over the prior art capacitor 10 of FIG. 4, for the reasons described previously herein for capacitor 40 of FIG. 12.

FIGS. 24 to 27 illustrate another embodiment of an anode/capacitor assembly 200 according to the invention where the first and second separation sheets 64, 66 are replaced by a single separator sheet 202. The separator sheet 202 has the shape shown by the outer most dashed line in FIG. 24 and includes an intermediate region 204 between a first central region 206 and a second central region 208. The first and second central regions 206, 208 are partially surrounded by respective perimeter regions 210, 212.

Figure 25:
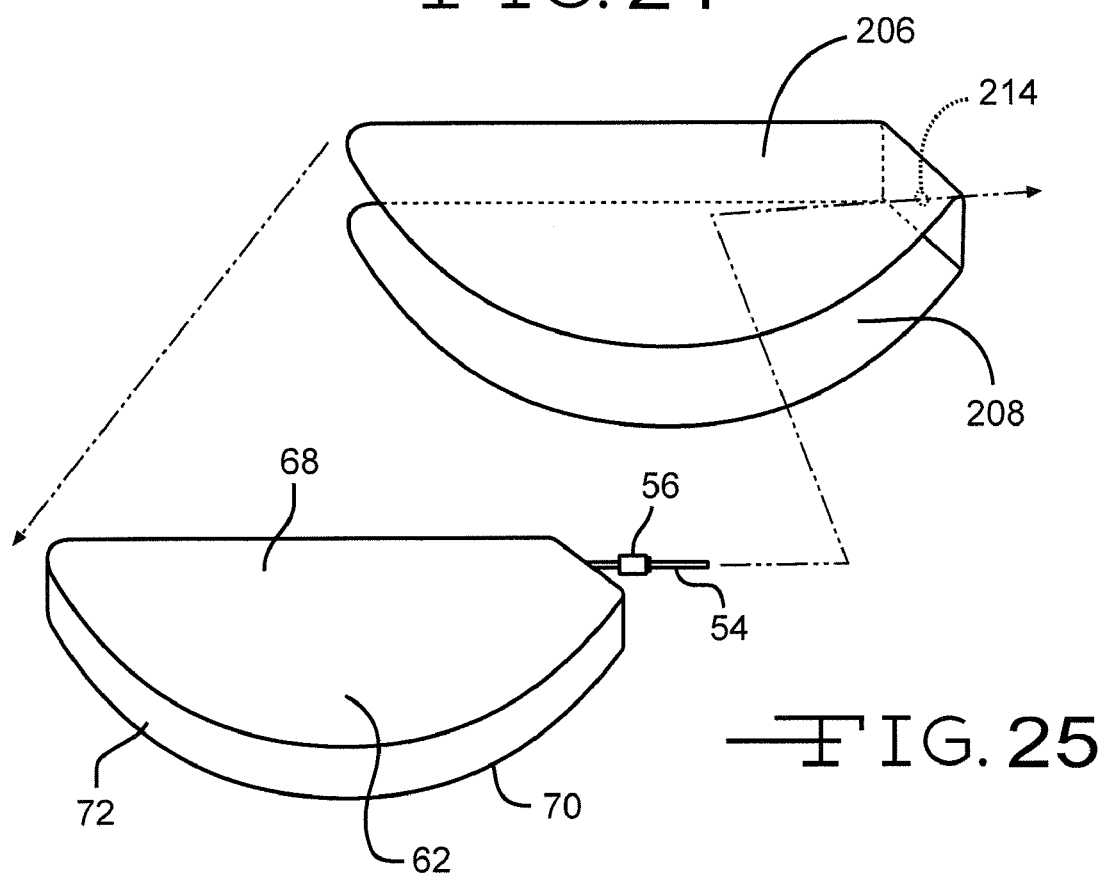
Figure 26:
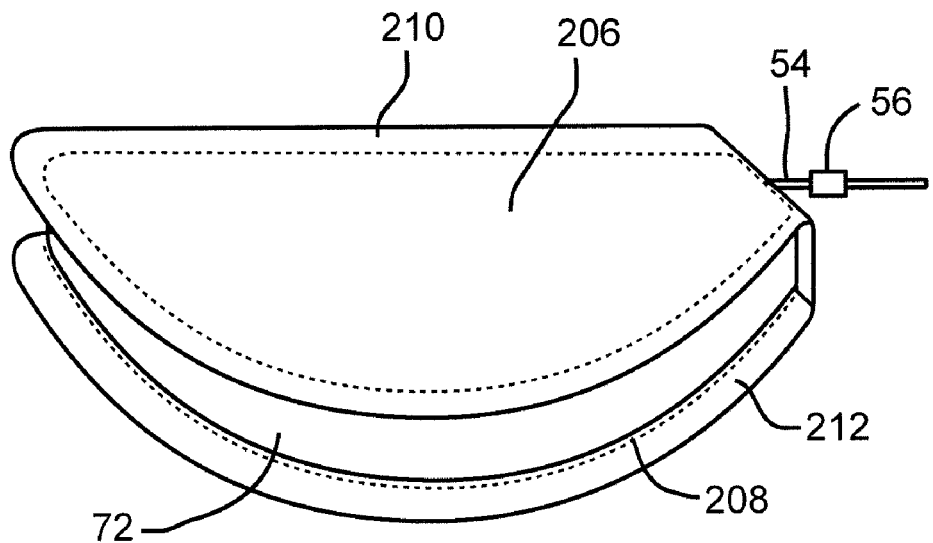
Figure 27:
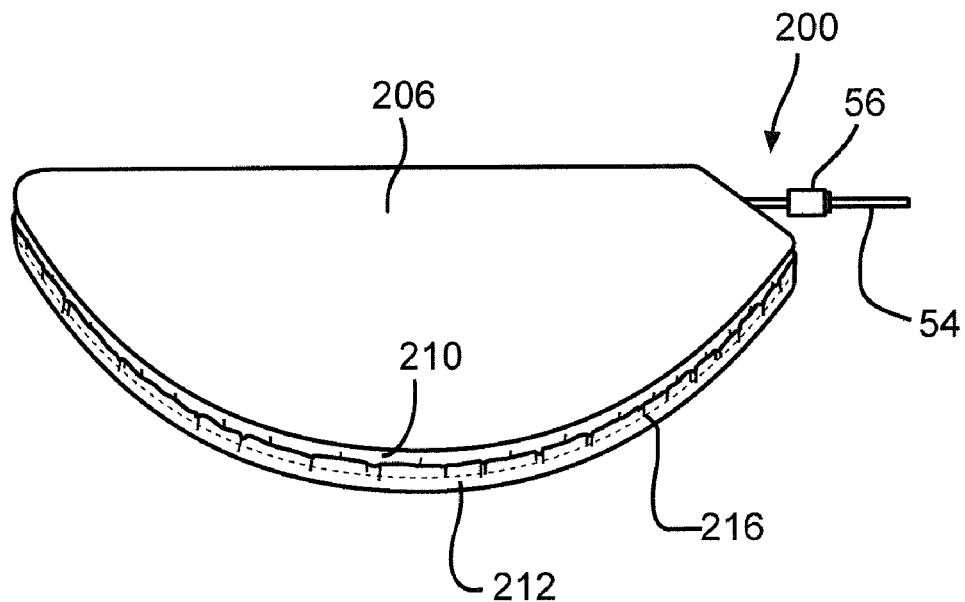
Figures 28, 28A:
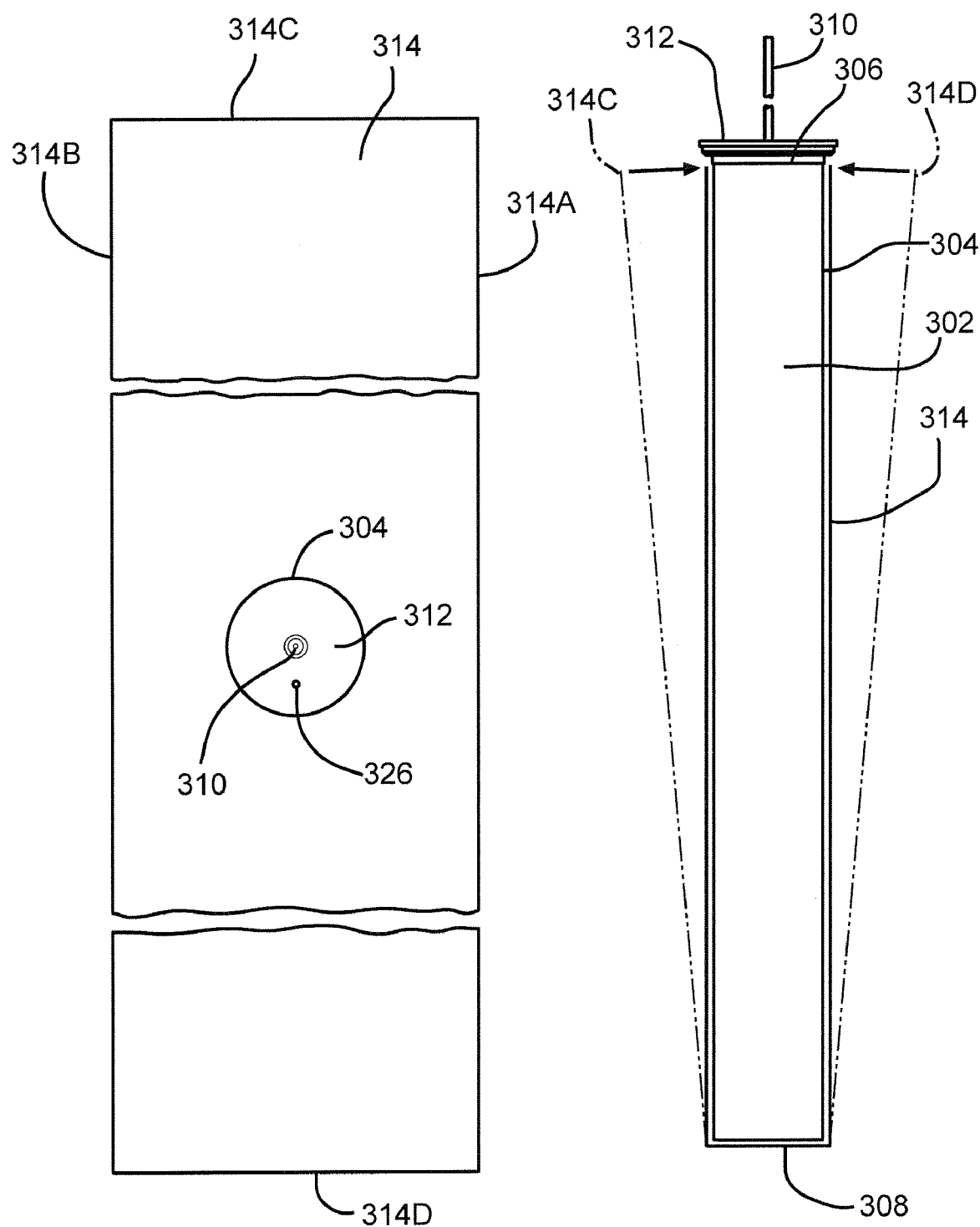
Figures 29, 30:
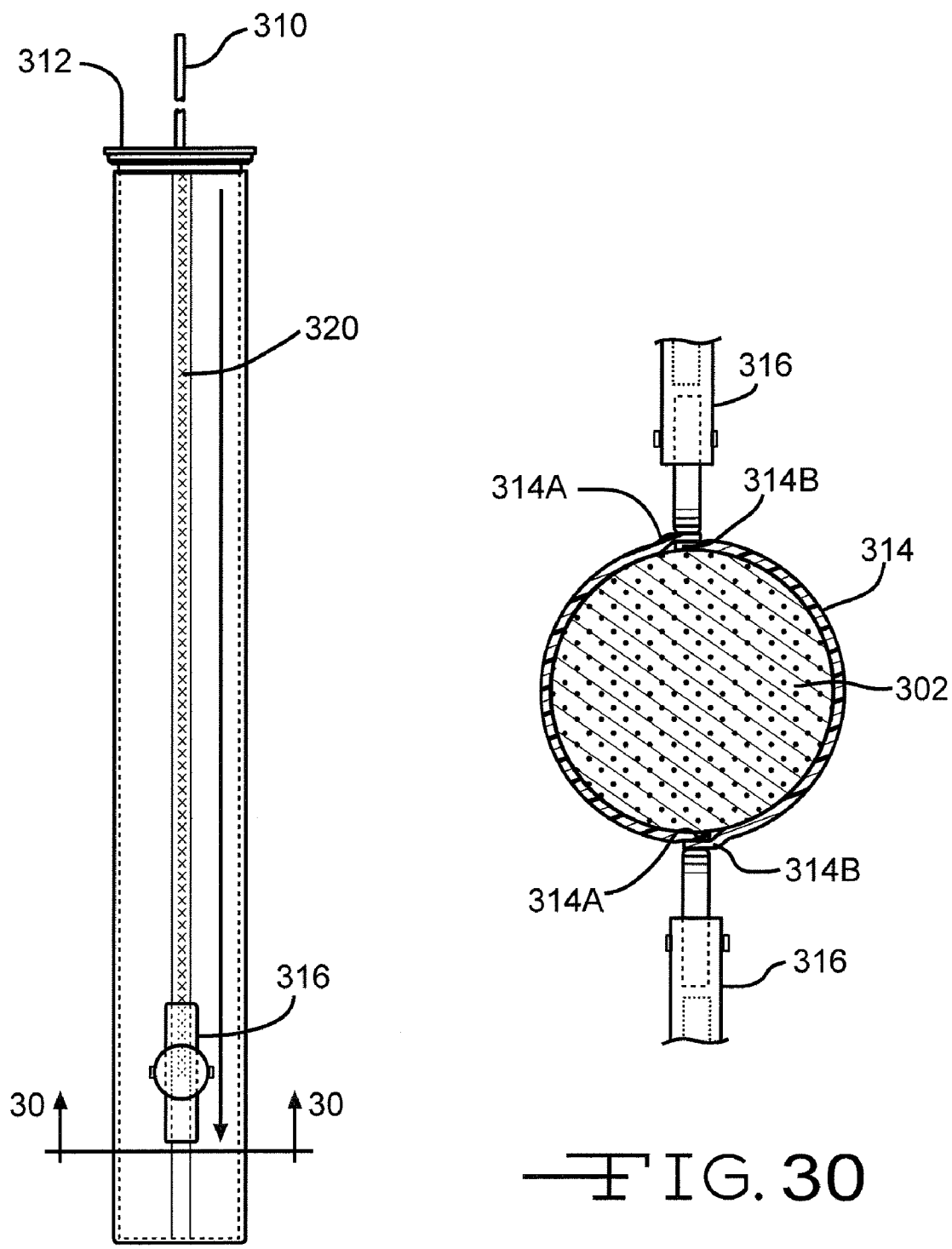
Figures 33, 34:
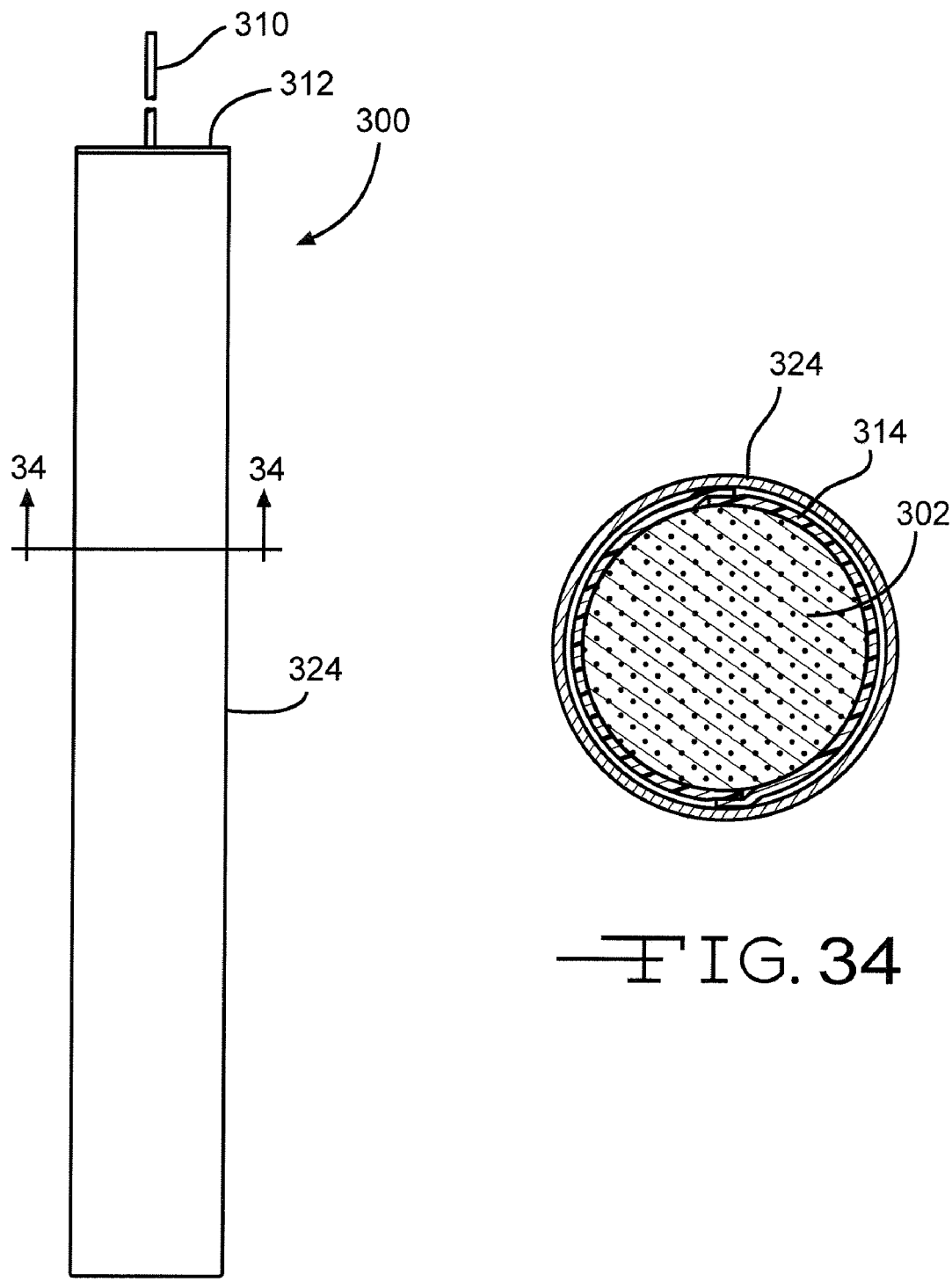

As shown in FIG. 25, the anode pellet 62 is enveloped in the separator 202 by first moving the opening 214 in the intermediate separation region 204 over the glass-to-metal seal 56 and the terminal pin 54 so that it resides against the anode sidewall 72. As shown in FIG. 26, the central regions 206, 208 are now in contact with the respective first and second major face walls 68, 70. The first perimeter region 210 is then moved into contact with the surrounding sidewall 72 followed by the second perimeter region 212 to form an overlapping relationship there. As with the anode/separator assembly 60 previously described in FIGS. 5 to 12, the overlapping perimeter regions 210, 212 are sealed to each other to a seam 216 with the anode pellet 62 serving as a backing surface.

FIGS. 28 to 34 illustrate a further embodiment of a capacitor 300 according to the present invention. In this embodiment, the anode pellet 302 has a generally cylindrically-shaped sidewall 304 extending to an upper end 306 and a lower end 308. A terminal pin 310 extends from the upper end 306. The terminal pin 310 is supported in a header assembly 312 by a glass-to-metal seal (not shown).

A separator sheet 314 having a generally rectangular shape comprising spaced apart long sides 314A and 314B extending to and meeting with opposed ends 314C and 314D is provided. The anode pellet 302 is placed on the separator sheet 314 laid flat with the lower anode end 308 centered between the spaced apart sides 314A, 314B and opposed ends 314C, 314D. The opposed ends 314C, 314D are then folded up toward the header assembly 312. In that manner, the spaced apart separator sides 314A and 314B are moved into an overlapping relationship with each other on opposite "sides" of the cylindrical anode pellet. A heating device 316 is then moved along this overlap 318 to seal the separator 314 and form a seam 320 (FIG. 32). The separator material adjacent to the upper end 306 of the anode pellet 302 is trimmed and sealed there as well. The separator sheet 314 is sufficiently sized so that the opposed ends 314C, 314D tuck over the upper end 306 of the anode pellet 302 under the header 312 but not so far as to touch the terminal pin 310.

As shown in FIG. 31, the resulting anode/separator assembly 322 including the header 312 is then moved into a cylindrically-shaped casing 324. The casing 324 is closed at its lower end but open at the top. A cathode active material (not shown) is supported on the inner surface of the casing 324 directly opposite the outer surface of the anode pellet 302, as is well known by those skilled in the art. The header 312 has a rim 312A that sits in the upper end of the casing 324 in a snug-fitting relationship. The capacitor 300 is completed by welding the header 312 to the casing 324 at the rim 312A, fitting a working electrolyte (not shown) into the casing through a fill opening 326 in the header 312 and welding a closure member therein.

While the embodiment shown in FIGS. 28 to 34 is illustrated with a cylindrically-shaped anode pellet 302, it is not intended to be so limited. Instead, the anode pellet may have a D-shaped cross-section perpendicular to its longitudinal axis as shown in U.S. Pat. No. 7,072,171 to Muffoletto et al. This patent is assigned to the assignee of the present invention and incorporated herein by reference. Other shapes of anode pellets only limited by the imagination of those skilled in the art are contemplated by the present invention. In that respect, the present invention is to be construed broadly so that regardless the shape of the anode pellet, the pellet sidewall is used as a backing against which two layers of separator material, whether from two sheets or of a single sheet, are provided in an overlapping relationship and then sealed to each other at a seam.

The respective capacitors 40, 118, 144 and 300 of FIGS. 12A, 15, 23 and 33 may be comprised of electrode active materials known in the art. The anode active material of anode pellets 62 and 302 may be of a metal selected from the group consisting of tantalum, aluminum, titanium, niobium, zirconium, hafnium, tungsten, molybdenum, vanadium, silicon, germanium, and alloys and/or mixtures thereof. As is well known by those skilled in the art, the anode metal in powdered form, for example tantalum powder, is compressed into a pellet having a wire serving as an anode terminal pin embedded therein and extending therefrom as previously described herein, and sintered under a vacuum at high temperatures. The porous body is then anodized in a suitable electrolyte to fill its pores with the electrolyte and to form a continuous dielectric oxide film on the sintered body. The anode assembly is then formed to a desired voltage to produce an oxide layer over the sintered body and anode terminal pin.

The coated films 45 and 47 may be made of cathode active material including an oxide of a first metal, the nitride of the first metal, the carbon nitride of the first metal, and/or the carbide of the first metal, the oxide, nitride, carbon nitride and carbide having pseudocapacitive properties. The first metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and lead. The cathode active material may also include a second or more metals. The second metal is in the form of an oxide, a nitride, a carbon nitride or carbide. The second metal is different than the first metal and is selected from one or more of the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, and niobium. In a preferred embodiment of the invention, the cathode active material includes an oxide of ruthenium or oxides of ruthenium and tantalum.

The sheets of separator material prevent an internal electrical short circuit between the anode and cathode active materials in the capacitors 40, 118, 144 and 300, and have a degree of porosity sufficient to allow flow therethrough of the working electrolyte during the electrochemical reaction within the capacitors. Illustrative separator materials include woven and non-woven fabrics of polyolefinic fibers including polypropylene and polyethylene, or fluoropolymeric fibers including polyvinylidene fluoride, polyethylenetetrafluoroethylene, polytetrafluoroethylene, and polyethylenechlorotrifluoroethylene laminated or superposed with a polyolefinic or fluoropolymeric microporous film, non-woven glass, glass fiber materials and ceramic materials.

Suitable microporous films include a polyethylene membrane commercially available under the designation SOLUPOR®, (DMS Solutech); a polytetrafluoroethylene membrane commercially available under the designation ZITEX®, (Chemplast Inc.) or EXCELLERATOR®, (W. L. Gore and Associates); a polypropylene membrane commercially available under the designation CELGARD®, (Celgard LLC); and a membrane commercially available under the designation DEXIGLAS®, (C. H. Dexter, Div., Dexter Corp.). A particularly preferred separator material is sold by the Millipore Corporation under the MILLIPORE® as catalogue no. SF1J182I06. Cellulose based separators also typically used in capacitors are contemplated by the scope of the present invention. Depending on the electrolyte used, the separator can be treated to improve its wettability, for example with a surfactant, as is well known by those skilled in the art.

The casing members of the capacitors 40, 118, 144 and 326 may be made of a metal selected from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof. Suitable glasses for glass-to-metal seal 56 (FIG. 1) are, for example, ELAN® type 88 or MANSOL® type 88.

A suitable working electrolyte for the capacitors 40, 118, 144 and 300 is described in U.S. Pat. No. 6,219,222 to Shah et al., which includes a mixed solvent of water and ethylene glycol having an ammonium salt dissolved therein. U.S. Pat. No. 6,687,117 to Liu and U.S. Patent Application Pub. No. 2003/0090857 describe other electrolytes for the present capacitors. The electrolyte of the latter publication comprises water, a water-soluble inorganic and/or organic acid and/or salt, and a water-soluble nitro-aromatic compound while the former relates to an electrolyte having de-ionized water, an organic solvent, isobutyric acid and a concentrated ammonium salt. These patents and publications are assigned to the assignee of the present invention and incorporated herein by reference.

It is, therefore, apparent that there has been provided, in accordance with the present invention, an anode-separator assembly for a capacitor, a capacitor including the anode-separator assembly, and methods for making the assembly. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An anode/separator assembly for a capacitor, the assembly comprising:
    a) a pellet of anode active material having opposed first and second major face walls extending to and meeting with a surrounding sidewall;
    b) at least one sheet of separator material characterized as having been folded to at least partially envelope the anode pellet with first and second perimeter regions of the separator being in an overlapping relationship with each other; and
    c) a fused seam formed of the overlapping first and second perimeter regions of the separator sheet against the anode pellet surrounding sidewall serving as a backing surface as the fused seam was formed.

2. An anode/separator assembly for a capacitor, the assembly comprising:
    a) a pellet of anode active material having opposed first and second major face walls extending to and meeting with a surrounding sidewall; and
    b) a separator enclosing the pellet and comprising:
        i) a first sheet of separator material including a first central region contiguous with the first major face wall of the anode pellet and a first perimeter region folded into contact with the surrounding sidewall of the anode pellet; and
        ii) a second sheet of separator material including a second central region contiguous with the second major face wall of the anode pellet and a second perimeter region overlapping a portion or the first perimeter region of the first separator sheet at the anode pellet surrounding sidewall; and
        iii) wherein the first and second separator sheets are sealed to each other at a fused seam formed of the overlapping first and second perimeter regions against the anode pellet surrounding sidewall serving as a backing surface as the fused seam was formed.

3. The anode/separator assembly of claim 2 wherein the first and second separator sheets are comprised of a plurality of layers of separator material.

4. The anode/separator assembly of claim 3 wherein the first separator sheet is comprised of first and second layers of separator material and the second separator sheet is comprised of third and fourth layers of separator material.

5. The anode/separator assembly of claim 4 wherein the first, second, third, and fourth layers of separator material are interleaved prior to forming the seam.

6. The anode/separator assembly of claim 2 wherein the first and second separator sheets include material selected from the group consisting of polypropylene, polyethylene, polyvinylidene fluoride, polyethylenetetrafluoroethylene, polytetrafluoroethylene, polyethylenechloro-trifluoroethylene.

7. The anode/separator assembly of claim 2 wherein the second perimeter region of the second separator sheet is in contact with the surrounding sidewall of the anode pellet and the first perimeter region of the first separator material is in contact with the second perimeter region.

8. The anode/separator assembly of claim 2 wherein:
    a) the first perimeter region of the first separator sheet is comprised of an inner perimeter region and an outer perimeter region;
    b) the second perimeter region of the second separator sheet is in contact with the outer perimeter region of the first separator sheet, thereby forming the overlap between the first and second separator sheets; and
    c) wherein the overlap of the second perimeter region of the second separator sheet and the outer perimeter region of the first separator sheet is characterized as having been folded into contact with the inner perimeter region of the first separator sheet, and wherein the first and second separator sheets are characterized as having been sealed to each other at the overlapping first and second separator sheets contacting the inner perimeter region of the first separator sheet against the anode pellet surrounding sidewall serving as the backing surface as the fused seam was formed.

9. The anode/separator assembly of claim 8 wherein the sea of the separator is characterized as having been first formed as an overlap flap sea directed outwardly from the surrounding sidewall of the anode pellet, and wherein the overlap flap sea is characterized as having been subsequently folded toward the surrounding sidewall of the anode pellet and sealed to the inner perimeter region of the first separator sheet against the anode pellet surrounding sidewall serving as the backing surface.

10. A capacitor, which comprises:
    a) a casing comprising first and second casing members secured to each other;
    b) an anode comprising a pellet of anode active material and having opposed first and second major face walls extending to and meeting with a surrounding sidewall;
    c) a separator enclosing the anode pellet and comprising:
        i) a first sheet of separator material including a first central region contiguous with the first major face wall of the anode pellet and a first perimeter region folded into contact with the surrounding sidewall of the anode pellet; and ii) a second sheet of separator material including a second central region contiguous with the second major face wall of the anode pellet and a second perimeter region overlapping a portion of the first perimeter region of the first separator sheet at the surrounding sidewall;

iii) wherein the first and second separator sheets are sealed to each other at a fused sea formed at the overlap of their first and second perimeter regions against the anode pellet surrounding sidewall serving as a backing surface as the fused seam was formed;

d) a cathode comprising cathode active material supported on the interior surfaces of the casing members opposite the first and second major face walls of the anode pellet; and e) an electrolyte contacting the cathode and the anode.

11. The capacitor of claim 10 wherein the first and second separator sheets are comprised of a plurality of layers of separator material.

12. The capacitor of claim 11 wherein the first separator sheet is comprised of first and second layers of separator material and the second separator sheet is comprised of third and fourth layers of separator material.

13. The capacitor of claim 12 wherein the first, second, third, and fourth layers of separator material are interleaved prior to forming the seam.

14. The capacitor of claim 10 wherein the first and second separator sheets include material selected from the group consisting of polypropylene, polyethylene, polyvinylidene fluoride, polyethylenetetrafluoroethylene, polytetrafluoroethylene, polyethylenechloro-trifluoroethylene.

15. The capacitor of claim 10 wherein the second perimeter region of the second separator sheet is in contact with the surrounding sidewall of the anode pellet and the first perimeter region of the first separator material is in contact with the second perimeter region.

16. The capacitor of claim 10 wherein:

a) the first perimeter region of the first separator sheet is comprised of an inner perimeter region and an outer perimeter region;

b) the second perimeter region of the second sheet of separator material is in contact with the outer perimeter region of the first separator sheet, thereby forming the overlap between the first separator sheet and the second separator sheet; and c) wherein the overlap of the second perimeter region of the second separator sheet and the outer perimeter region of the first separator sheet is folded into contact with the inner perimeter region of the first separator sheet, and wherein the first and second separator sheets are characterized as having been sealed to each other at the overlapping first and second separator sheets contacting the inner perimeter region of the first separator sheet against the anode pellet surrounding sidewall serving as the backing surface as the fused seam was formed.

17. The capacitor of claim 16 wherein the seam of the separator is characterized as having been first formed as an overlap flap sea directed outwardly from the surrounding sidewall of the anode pellet, and wherein the overlap flap sea is characterized as having been subsequently folded toward the surrounding sidewall of the anode pellet and sealed to the inner perimeter region of the first separator sheet against the anode pellet surrounding sidewall serving as the backing surface.

18. A method for making an anode/separator assembly for a capacitor, the method comprising the steps of:

a) providing an anode comprising a pellet of anode active material having opposed first and second major face walls extending to and meeting with a surrounding side wall;

b) contacting the first major face wall of the anode pellet with a first central region of a first sheet of separator material;

c) folding a first perimeter region of the first separator sheet into contact with the surrounding side wall of the anode pellet;

d) contacting the second major face wall of the anode pellet with a second central region of a second sheet of separator material;

e) contacting the second perimeter region of the second separator sheet with the first perimeter region of the first separator sheet to form an overlap between the first and second separator sheets at the anode pellet surrounding sidewall; and f) sealing the first and second separator sheets to each other at the overlap with the anode pellet surrounding sidewall serving as a backing surface to form a sea that is contiguous with a portion of the surrounding sidewall of the pellet.

19. The method of claim 18 further comprising placing the second perimeter region of the second separator sheet in contact with the surrounding sidewall of the anode pellet and the first perimeter region of the first separator material is in contact with the second perimeter region lying against the anode pellet surrounding sidewall.

20. The method of claim 18 wherein the first perimeter region of the first separator sheet is comprised of an inner perimeter region and an outer perimeter region, and the method further comprising contacting the second perimeter region of the second separator sheet with the outer perimeter region of the first separator sheet to form the overlap of the first and second separator sheets.

21. The method of claim 20 wherein the overlap is directed outwardly from the surrounding sidewall of the anode pellet, and the method further comprising folding the overlap into contact with the inner perimeter region of the first separator sheet, and sealing the overlap to the inner perimeter region of the first separator sheet with the anode pellet surrounding sidewall serving as the backing surface.

22. The method of claim 18 wherein the sealing of the first and second separator sheets to each other is performed by a heat sealing device.

23. The method of claim 18 including providing the first separator sheet being comprised of first and second layers of separator material and the second separator sheet being comprised of third and fourth layers of separator material.

24. The method of claim 23 including interleaving the first, second, third, and fourth layers of separator material prior to forming the seam.

25. The method of claim 18 including selecting the material of the first and second separator sheets from the group consisting of polypropylene, polyethylene, polyvinylidene fluoride, polyethylenetetrafluoroethylene, polytetrafluoroethylene, polyethylenechloro-trifluoroethylene.

* * * * *

UNITED STATES PATENT AND TRADEMARK OFFICE
CERTIFICATE OF CORRECTION

PATENT NO. : 7,710,713 B2
APPLICATION NO. : 11/858176
DATED : May 4, 2010
INVENTOR(S) : Monica Restorff, Douglas Eberhard and Troy Lindke It is certified that error appears ins the above-identified patent and that said Letters Patent is hereby corrected as shown below:

Claim 2, Clause ii), line 4 - replace "or" with "of"

Claim 9, line 1 - replace "sea" with "seam"

Claim 9, line 3 - replace "sea" with "seam"

Claim 9, line 4 - replace "sea" with "seam"

Claim 10, Clause iii), line 2 - replace "sea" with "seam"

Claim 17, line 3 - replace "sea" with "seam"

Claim 17, line 4 - replace "sea" with "seam"

Claim 18, Clause f), line 3 - replace "sea" with "seam"

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,710,713 B2  Page 1 of 1
APPLICATION NO. : 11/858176
DATED : May 4, 2010
INVENTOR(S) : Monica Restorff, Douglas Eberhard and Troy Lindke It is certified that error appears ins the above-identified patent and that said Letters Patent is hereby corrected as shown below:

Column 12, line 2, (Claim 2, Clause ii, line 4) - replace "or" with "of"

Column 12, line 50, (Claim 9, line 1) - replace "sea" with "seam"

Column 12, line 52, (Claim 9, line 3) - replace "sea" with "seam"

Column 12, line 53, (Claim 9, line 4) - replace "sea" with "seam"

Column 13, line 11, (Claim 10, Clause iii, line 2) - replace "sea" with "seam"

Column 13, line 62, (Claim 17, line 3) - replace "sea" with "seam"

Column 13, line 63, (Claim 17, line 4) - replace "sea" with "seam"

Column 14, line 26, (Claim 18, Clause f, line 3) - replace "sea" with "seam"

This certificate supersedes the Certificate of Correction issued June 8, 2010.

Signed and Sealed this

Twenty-ninth Day of June, 2010

David J. Kappos
*Director of the United States Patent and Trademark Office*